(12) United States Patent
Suhling

(10) Patent No.: US 11,383,336 B2
(45) Date of Patent: Jul. 12, 2022

(54) REVERSIBLE FLIP-AWAY WORK STOP FOR STRUT SYSTEMS

(71) Applicant: Robert James Suhling, Waukegan, IL (US)

(72) Inventor: Robert James Suhling, Waukegan, IL (US)

(*) Notice: Subject to any disclaimer, the term of this patent is extended or adjusted under 35 U.S.C. 154(b) by 282 days.

(21) Appl. No.: 16/905,360

(22) Filed: Jun. 18, 2020

(65) Prior Publication Data

US 2021/0394319 A1 Dec. 23, 2021

(51) Int. Cl.
*B23Q 1/44* (2006.01)
*G01B 3/10* (2020.01)
*B23D 59/00* (2006.01)

(52) U.S. Cl.
CPC ............ *B23Q 1/44* (2013.01); *B23D 59/001* (2013.01); *G01B 3/10* (2013.01)

(58) Field of Classification Search
CPC ...... B23Q 1/44; B23Q 16/001; B23D 59/001; G01B 3/10; B27B 27/10; B27B 27/02
See application file for complete search history.

(56) References Cited

U.S. PATENT DOCUMENTS

| | | |
|---|---|---|
| 1,504,248 A | 8/1924 | Johnson |
| 1,823,268 A | 9/1931 | Gordon |
| 2,435,382 A | 2/1948 | Caskey |
| 4,693,158 A | 9/1987 | Price |
| 4,817,693 A | 4/1989 | Schuler |
| 4,871,156 A * | 10/1989 | Kozyrski ............ B26D 7/2614 269/319 |
| 4,887,653 A | 12/1989 | Thomas |
| 5,018,562 A | 5/1991 | Adams |
| 5,038,486 A * | 8/1991 | Ducate, Sr. ............ B27B 29/00 83/435.14 |
| 5,063,983 A | 11/1991 | Barry |

(Continued)

FOREIGN PATENT DOCUMENTS

GB 2484821 A * 4/2012 ............... B23Q 3/00

*Primary Examiner* — Nimeshkumar D Patel
*Assistant Examiner* — Tania Courson
(74) *Attorney, Agent, or Firm* — Lesavich High-Tech Law Group, S.C.; Stephen Lesavich

(57) ABSTRACT

A reversible flip-away work-stop for strut systems. The reversible flip-way work stop includes a first component allowing a work stop positioning plate to pivot in a semi-circular motion allowing the work stop positioning plate to be moved and immediately configured in a right-handed configuration or a left-handed configuration without manual disassembly and reassembly in a strut in a strut system. A second component allowing the work stop positioning plate to be micro-adjusted to measurements including thousands of an inch for precisely measuring a material to be cut. A third component includes a pre-determined length to exactly match an alignment of a front face of the work stop positioning plate allowing a measurement to be read on a measuring component in the strut on the strut system without obstruction. The third component also including a pre-determined width and shape matching a width and a shape of a measuring component in the strut on the strut system allowing easy movement of the reversible flip-away work stop within the strut in the strut system and providing the ability to add a custom measuring component to the strut system.

19 Claims, 18 Drawing Sheets

EXPLODED PERSPECTIVE VIEW

(56) References Cited

U.S. PATENT DOCUMENTS

| | | | | |
|---|---|---|---|---|
| 5,267,818 | A | 12/1993 | Marantette | |
| 5,664,612 | A * | 9/1997 | Klemma | B25H 1/04 |
| | | | | 144/134.1 |
| 5,716,045 | A | 2/1998 | Taylor | |
| 5,765,448 | A | 6/1998 | Martelli | |
| 5,768,966 | A | 6/1998 | Duginske | |
| 5,845,555 | A * | 12/1998 | Dawley | B23Q 16/006 |
| | | | | 83/467.1 |
| 5,890,524 | A | 5/1999 | Tucker et al. | |
| 5,903,125 | A | 5/1999 | Prentice et al. | |
| 5,919,014 | A | 7/1999 | Weck et al. | |
| 6,328,510 | B1 | 12/2001 | Hanrath et al. | |
| 6,557,601 | B1 | 5/2003 | Taylor | |
| 6,851,243 | B1 | 2/2005 | Sandford | |
| 6,851,345 | B1 | 2/2005 | Kennelly et al. | |
| 7,036,540 | B2 | 5/2006 | Welsh et al. | |
| 7,100,515 | B2 | 9/2006 | Helm | |
| 7,261,502 | B2 | 8/2007 | Pasquetto | |
| 7,587,838 | B2 * | 9/2009 | Mastrobattista | B23Q 9/0042 |
| | | | | 33/640 |
| 7,798,187 | B1 * | 9/2010 | Duginske | B27B 27/10 |
| | | | | 144/253.1 |
| 8,033,535 | B2 | 10/2011 | Mannon | |
| 8,220,374 | B2 | 7/2012 | Wang | |
| 8,272,334 | B2 | 9/2012 | Wang et al. | |
| 8,342,055 | B2 | 1/2013 | Wang et al. | |
| 8,463,765 | B2 | 6/2013 | Lesavich | |
| 8,480,067 | B2 * | 7/2013 | Furlow | B23Q 16/001 |
| | | | | 269/74 |
| 8,621,969 | B2 * | 1/2014 | Dawley, III | B23D 47/04 |
| | | | | 83/462 |
| 9,037,564 | B2 | 5/2015 | Lesavich et al. | |
| 9,056,402 | B2 | 6/2015 | Clark | |
| 9,137,250 | B2 | 9/2015 | Lesavich et al. | |
| 9,361,479 | B2 | 6/2016 | Lesavich et al. | |
| 9,545,734 | B2 | 1/2017 | Suhling | |
| 9,569,771 | B2 | 2/2017 | Lesavich et al. | |
| 9,682,454 | B2 | 6/2017 | Suhling | |
| 10,245,653 | B2 | 4/2019 | Suhling | |
| 10,336,127 | B1 | 7/2019 | Suhling | |
| 10,843,368 | B2 * | 11/2020 | Friedebach | B27B 9/04 |
| 2002/0194971 | A1 | 12/2002 | Park | |
| 2005/0056345 | A1 * | 3/2005 | Duginske | B27B 27/02 |
| | | | | 144/144.1 |
| 2005/0139056 | A1 | 6/2005 | Gass | |
| 2005/0280228 | A1 | 12/2005 | Fernandes | |
| 2006/0248998 | A1 | 11/2006 | Duginske | |
| 2011/0208710 | A1 | 8/2011 | Lesavich | |
| 2012/0278622 | A1 | 11/2012 | Lesavich et al. | |
| 2014/0026725 | A1 * | 1/2014 | Makropoulos | B27B 9/04 |
| | | | | 83/13 |
| 2014/0189792 | A1 | 7/2014 | Lesavich et al. | |
| 2015/0298273 | A1 | 10/2015 | Suhling | |
| 2015/0306784 | A1 | 10/2015 | Suhling | |
| 2015/0379301 | A1 | 12/2015 | Lesavich et al. | |
| 2016/0321654 | A1 | 11/2016 | Lesavich et al. | |
| 2018/0043439 | A1 | 2/2018 | Suhling | |
| 2019/0381614 | A1 | 12/2019 | Suhling | |
| 2019/0389500 | A1 | 12/2019 | Suhling | |
| 2020/0001495 | A1 | 1/2020 | Suhling | |
| 2020/0215713 | A1 * | 7/2020 | Friedebach | B27B 9/04 |

\* cited by examiner

EXPLODED PERSPECTIVE VIEW

REVERSIBLE FLIP-AWAY WORK STOP FOR STRUT SYSTEMS

CROSS REFERENCE TO RELATED APPLICATIONS

Not applicable.

FIELD OF INVENTION

This application relates to a work-stop components for strut systems. More specifically, it relates to a reversible flip-away work stop for strut systems.

BACKGROUND OF THE INVENTION

The woodworking and metalworking industries utilize cutting stations including equipment which includes use of rotating saw blade that is moved or moves in relation to a work-piece in order to cut or grind material including, for example a long pieces of wood, wood molding, pieces of metal. The woodworking and metalworking industries often use jigs and fixtures in order to enhance the effectiveness of these cutting stations.

The jigs and fixtures are used for the purposes of positioning and repositioning a work-piece in woodworking and metalworking applications and these assemblies commonly referred to as "work-stops." Work-stops act as contact boundaries for wood and metal materials that are to be cut. Work-stops are used to correctly measure and position wood, metal and other materials (e.g., plastic, composite, etc.) meant for modification activities, such as cutting, shaping, paring, scoring, boring, milling and grinding.

Channel-based work-stop assemblies can be characterized as work-stops which use a strut, rail or track system to allow for proper alignment and mobility of the work-stops in relation to these components. Flip-away systems are able to be temporarily moved and removed from the material work-piece plane, which is often accomplished through a flipping movement of axial rotation away from the material work-piece plane. Flip-away systems allow for quick and easy operation, but are often criticized for imprecision and can suffer from excessive pliability.

There are a number of problems associated with flip stops. One problem is that flip stops known in the art are not manufactured to a precise length, are not aligned with a work stop plate and typically obscure a user's ability to precisely read a measurement on a strut measuring component. This typically causes confusion and may lead to cutting materials at a wrong length.

Another problem is that work stops known in the art are also typically not manufactured to a similar width or shape of a strut measuring component and cannot be used directly in or on existing integral strut measuring component.

Another problem is that work stops known in the art cannot be immediately rotated and/or pivoted immediately from a right hand configuration to a left hand configuration without disassembly and reassembly, which takes a considerable amount of time and manual effort by a user.

Another problem is that work stops known in the art used with strut systems do not provide the ability to insert a custom strut measuring component in a strut system including or not including existing integral strut measuring component, making the strut system less flexible and less useful.

Another problem is that work stops known in the art do not have curved work stop plates and do not allow work stop plates to be pushed up and out of the way, and then applying pressure on top of the material to be cut.

Another problem is that work stops know in the art are typically placed alongside a strut in a strut system. This placement typically interferes with the material being cut and requires frequent repositioning in the strut system.

There are been a number of attempts to solve some of the problems associated with work-stops. For example, U.S. Pat. No. 9,682,454 that issued to Suhling teaches "An in-line indexing mechanism as part of a work-stop system which employs a lead screw to alter the relative distance between a work-stop plate and a swing arm—as well as alignment pins and springs to maintain contact and rigidity between this work-stop plate and swing arm—in order to precisely alter the parameters of a workpiece plane. In particular, the indexing mechanism of the preferred embodiment resides within the extension of an arm, and is located, by default, within the workpiece plane; the act of indexing therefore exerts force upon a workpiece along a coincident axis within said workpiece plane. Additionally, the indexing mechanism may be removed from the workpiece plane, by way of axially rotating the arm, without abandoning the original workpiece parameter and adjustment values."

U.S. Pat. No. 9,545,734 that issued to Suhling teaches "A clamp that is meant to act as a coordinate locator for any number of power tools, but most specifically for use with the Biesemeyer T-style table saw fences. The assembly is comprised of a C-frame which offers the ability to enact a clamping action and the ability to enact an indexing action. The design of the assembly allows not only for the clamping of an imprecise reference point along a table saw fence rail, but also the fine adjustment of indexing a screw against the table saw fence."

U.S. Pat. No. 9,056,402, that issued to Clark teaches "In one example, a machinery fence support system comprises a worktable having a recess therein and a cutting element protruding upwardly from the worktable. The system has a track which is slidably received within the recess of the worktable. A bracket connected to the track; and a sacrificial fence is adjustably connected to the bracket. A track system is connected to the sacrificial fence and a stop assembly connected to the track system. The track slides within the recess of the worktable such that the sacrificial fence passes over the cutting element such that a beaded face frame feature is cut into a workpiece."

U.S. Pat. No. 8,621,969, that issued to Dawley teaches "An integrated mechanical stop and securing apparatus for the safe positioning and securing of a short cut-off work-piece in close proximity to a cutting tool during a cutting operation. The mechanical stop is attached to a fence, work surface or similar structure using a moveable clamp. The workpiece stop further includes a pivotally attached securing member that abuts a surface of a workpiece during a cutting operation involving a relatively short cut-off. Biasing force for the securing member is provided by an operator grasping a handle on the securing member. Increased safety is provided when the stop device maintains the operator's hands outside of the effective cutting area of the power tool, while providing an accurate and reliable stop to index the cut."

U.S. Pat. No. 8,480,067, that issued to Furlow teaches "An improved adjustable work stop device for use in positioning work pieces which for machining purposes are clamped in a vice or other clamping means. The work stop comprises a laterally adjustable base, a flipper mount with flip arm movable in a vertical direction and lockable into desire position thereto, a flip arm with a positioner which is pivotably secured and rotates away from the work piece without scrubbing the work piece surface whereby clearance for machining, work or the like is accomplished on the butted side of the work piece."

U.S. Pat. No. 8,342,055, that issued to Wang teaches "This invention provides a precise positioning platform by using of toggle type principle, wherein the positioning platform can be single toggle type, double toggle type, or combination with multi-link to enhance positioning platform precision."

U.S. Pat. No. 8,272,334, that issued to Wang teaches "A three-link toggle type positioning platform comprises a first motor, a first ballscrew coupled to said first motor, a first linkage attached to the ballscrew a second linkage attached to the first linkage, and a third linkage attached to the second linkage. The ballscrew drives the first linkage, and then the first linkage drives the second linkage, and then the second linkage drives the third linkage, which drives a platform in a predetermined direction."

U.S. Pat. No. 8,220,374, that issued to Wang teaches "A retaining device for a wood sawing machine contains an index table fixed on a cutting deck of the wood sawing machine to displace straightly and reciprocately along the cutting deck; a guiding plate fixed on the cutting deck, connected with the index table, and including a slot disposed thereon; a vertically moving set including at least one sliding block, at least one screw rod, a longitudinally displacing holder, at least one first adjusting nuts, and at least one first second adjusting nuts; wherein the sliding block is slidably connected with the slot of the guiding plate and displaces along the slot reciprocately, the screw rod is coupled on the sliding block respectively; a retaining and pressing assembly including a handle, two arms, two connecting posts, two stems, and a pressing panel."

U.S. Pat. No. 5,845,555, that issued to Dawley teaches "A multi-position adjustable work stop assembly employs a traveling gauge assembly that cooperates with independently adjustable and inexpensive location stops. The gauge assembly is moveable along a fence to define a plurality of work locating positions determined by the location stops. An engagement or contact member on the gauge assembly selectively intercepts the location stops to precisely locate the gauge assembly in the desired positions. The engagement member is an arm mounted for movement between first and second positions on the gauge assembly. In the first position the engagement member intercepts the location stops when the gauge assembly is moved longitudinally on the fence. In the second position the engagement member clears the location stops during such movement."

U.S. Pat. No. 5,664,612, that issued to Klemma teaches "A portable woodworking assembly for use in supporting wooden workpieces and portable power tools for cutting, shaping and forming the workpieces with the portable power tools. This assembly includes a frame sub-assembly; one or more tool support structures including clamping structures for fixedly attaching the tool support structure to the frame sub-assembly and alternative slide structures which engage the frame sub-assembly for movably guiding a portable power tool relative thereto; and a workboard sub-assembly operatively associated with the frame sub-assembly to support a workpiece relative thereto and selectively position said workpiece relative to the portable power tool so that the power tool may engage the workpiece in the desired fashion."

However, these solutions still do not solve all of the problems associated with work stops. Thus, it is desirable to solve some of the problems associated with work stops.

SUMMARY OF THE INVENTION

In accordance with preferred embodiments of the present invention, some of the problems associated with work-stops are overcome. A reversible flip-away work stop for strut systems is presented.

The reversible flip-way work stop includes a first component allowing a work stop positioning plate to pivot in a semi-circular motion allowing the work stop positioning plate to be moved and immediately configured in a right-handed configuration or a left-handed configuration without manual disassembly and reassembly in a strut in a strut system. A second component allowing the work stop positioning plate to be micro-adjusted to measurements including thousands of an inch for precisely measuring a material to be cut. A third component includes a pre-determined length to exactly match an alignment of a front face of the work stop positioning plate allowing a measurement to be read on a strut measuring component in the strut on the strut system without obstruction. The third component also including a pre-determined width and shape matching a width and a shape of a strut measuring component in the strut on the strut system allowing easy movement of the reversible flip-away work stop within the strut in the strut system and providing the ability to add a custom strut measuring component to the strut system.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Reversible Flip-Way Work Stop for Strut Systems

Figure 1:
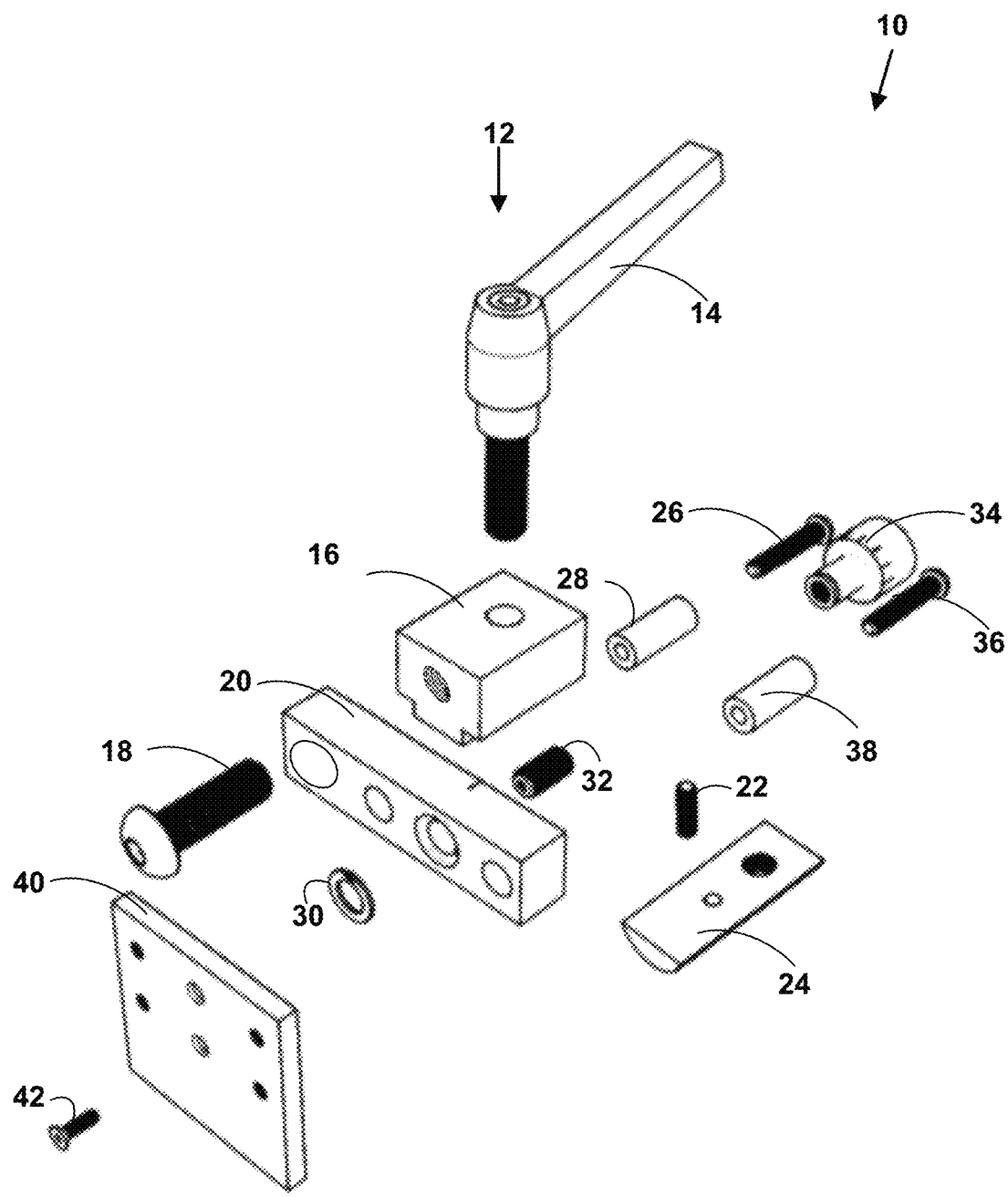
FIG. 1 is a block diagram illustrating an exploded view of an exemplary reversible flip-away work stop for strut systems.

FIG. 1 is a block diagram 10 illustrating an exploded view of a reversible flip-away work-stop 12 for strut systems.

The reversible flip-away work-stop 12 includes a ratcheting repositioning handle 14, main body component 16, flip arm stop attachment pivot connecting means 18, flip arm stop component 20, first strut securing component connecting means 22, strut securing component 24, first alignment connecting means 26, first alignment connecting dowel 28, snap C-clip ring 30, threaded micro-adjusted rod 32, calibrated dial 34, second alignment connection connecting means 36, second alignment connection dowel 38, work stop positioning plate 40 and work stop positioning plate fastening connecting means 42. However, the present invention is not limited to such an embodiment, and more, fewer and other types of components can be used to practice the invention.

The present invention includes a reversible flip-away work-stop 12 with components made of various metals. The metal components, may be hardened, un-hardened and/or plated or un-plated. However, the present invention is not limited to such an embodiment and the present invention may include a reversible flip-away work-stop 12 including individual components made from a combination of metal, plastic, wood, composite materials and/or other types of materials. The individual components of the reversible flip-away work-stop 12 are individually manufactured, machined, 3D printed by a 3D printer, extruded and/or pultruded.

"Manufacturing" includes the process of making items from raw materials. "Machining" includes various processes in which a piece of raw material is cut into a desired final shape and size by a controlled material-removal process.

A "3D printer" includes 3D printing or "Additive manufacturing." 3D printing is a process of making a three-dimensional solid object of virtually any shape from a digital model. 3D printing is achieved using an "additive process," where successive layers of material (e.g., metal, plastic, etc.) are laid down in different shapes. 3D printing is also considered distinct from traditional manufacturing and/or machining techniques, which mostly rely on the removal of material by methods such as cutting or drilling and are "subtractive" processes.

"Extrusion" is a manufacturing process where a material such as aluminum, etc. is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

"Pultrusion" is a manufacturing process for producing continuous lengths of materials. Pultrusion raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultrusion process is normally continuous and highly automated. Reinforcement materials, such as roving, mat or fabrics, are positioned in a specific location using preforming shapers or guides to form a pultrusion. The reinforcements are drawn through a resin bath where the material is thoroughly coated or impregnated with a liquid thermosetting resin. The resin-saturated reinforcements enter a heated metal pultrusion die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultrusion die to the exact shape of the die cavity. The laminate solidifies when cooled and it is continuously pulled through the pultrusion machine and cut to the desired length. The process is driven by a system of caterpillar or tandem pullers located between the die exit and the cut-off mechanism.

Figure 2:
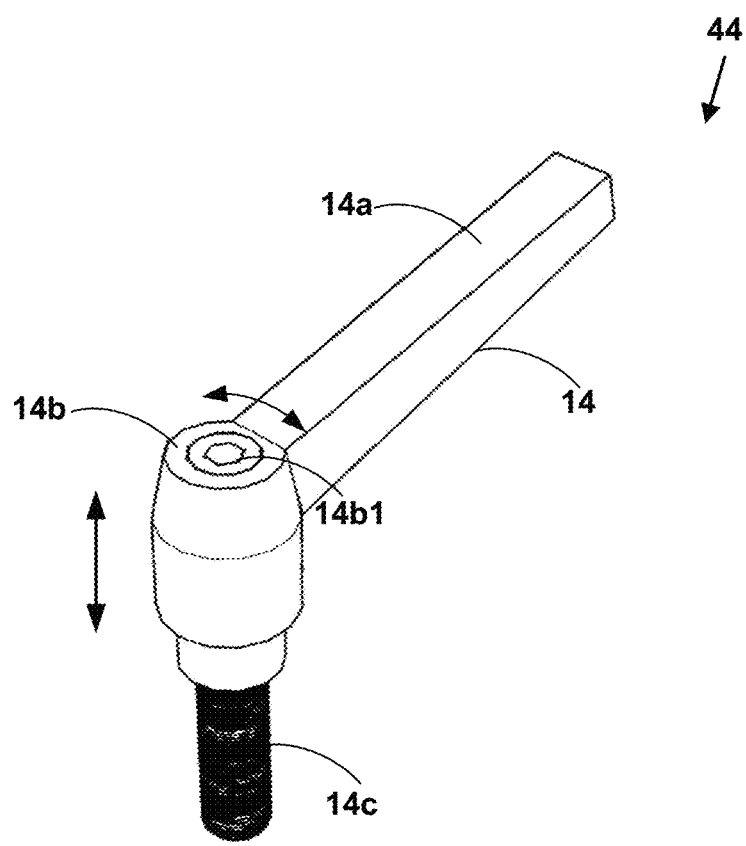
FIG. 2 is a block diagram illustrating a perspective view of an exemplary ratcheting repositioning handle.

FIG. 2 is a block diagram 44 illustrating a perspective view of an exemplary ratcheting repositioning handle 14.

Figure 10A:
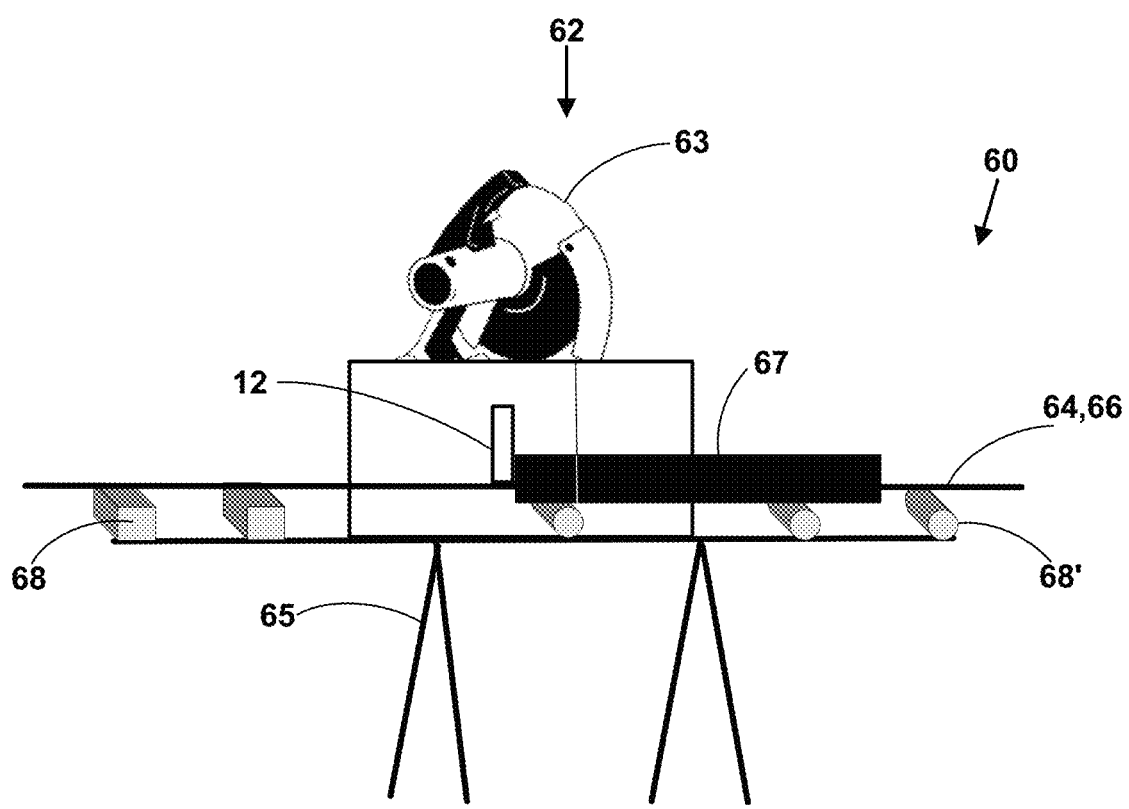
FIG. 10A is a block diagram illustrating an exemplary strut system.

The ratcheting repositioning handle 14 allows for grasping ratcheting repositioning of the reversible flip-away work-stop 12. The handle 14 also clears pivoting rotations of flip arm stop component 20. A "ratchet" is a component including set of angled teeth in which a pawl, cog, or tooth engages, allowing motion in one direction only. The handle 14 includes a grasping portion 14a, a ratchet portion 14b and a handle connection means 14c. The grasping portion 14a includes a flat polygonal grasping portion. However, the present invention is not limited to this embodiment and other shapes can be used for the grasping portion. The ratchet portion 14*b* includes a first set of a plurality of angular ratchet teeth 14*b*1 that allows the reversible flip-away work-stop 12 to be grasped, aligned, secured and unsecured in a strut rail component 64 in a strut system 62 (FIG. 10A). A strut rail 64 is a channel is used to brace, support and measure materials to be cut in the strut system 62. The ratchet portion 14*b* allows the handle 14 to be moved in an up-and-down motion to disengage and engage the angular ratchet teeth 14*b*1 and moved in a circular motion to engage a next angular ratchet tooth 14*b*1. The handle connection means 14*c* includes, but is not limited to a threaded component, to attach the handle 14 to the main body component 16 of the reversible flip-away work-stop 12.

In one embodiment, the handle 14 is replaced with a bolt, T-nut and/or other handle and/or grasping component.

However, the present invention is not limited to such embodiments and other types of handles (e.g., a pin and/rod type handle, etc.) with other sizes, shapes and with other grasping portions and with and/or without a ratchet portion can be used to practice the invention.

Figure 3A:
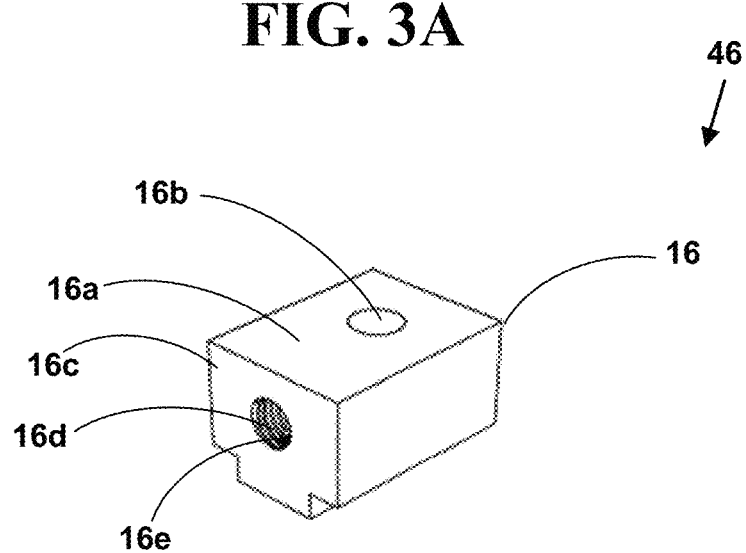
FIG. 3A is a block diagram illustrating a top perspective view of an exemplary main body component.

FIG. 3A is a block diagram 46 illustrating a top perspective view of an exemplary main body component 16.

Figure 3B:
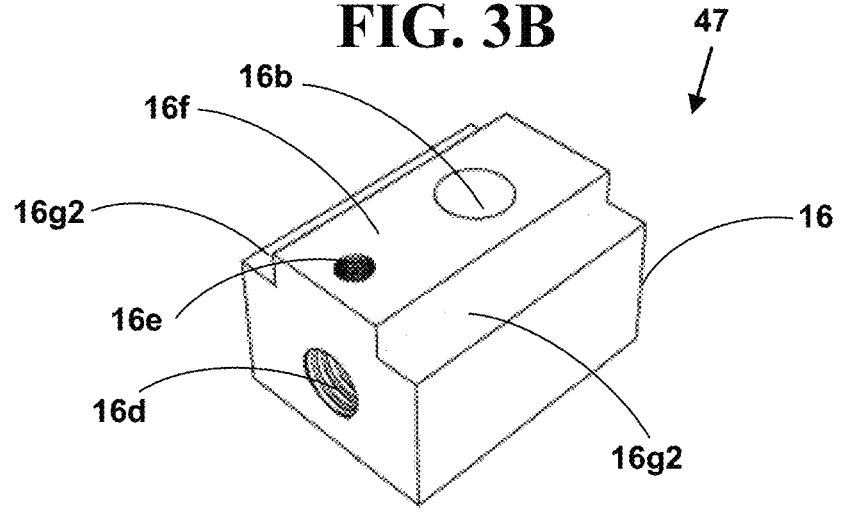
FIG. 3B is a block diagram illustrating a bottom perspective view of the exemplary main body component.

FIG. 3B is a block diagram 47 illustrating a bottom perspective view of the exemplary main body component 16.

In FIG. 3A, the main body component 16 of the reversible flip-away work-stop 12 includes a top surface 16*a* with a through receptacle 16*b* on the top surface 16*a* of the main body component 16 for accepting the threaded handle connection means 14*c*, a front surface 16*c* of the main body component 16 with a first threaded receptacle 16*d* for accepting a flip arm stop attachment pivot connecting means 18 to connect the main body component 16 to the flip arm stop component 20. A "receptacle" is an object and/or space used to accept and contain something.

The main body component further includes a second threaded receptacle 16*e* (illustrated within receptacle 16*d*) on a bottom portion for accepting a threaded connecting means 22 to hold a position of the flip arm stop attachment pivot connecting means 18 and align main body component 16 to a strut securing component 24.

In FIG. 3B, the main body component 16 further includes bottom surface component 16*f* that is specifically sized and shaped to include a surface area that matches a top surface 24*a* area of a top surface of the strut securing component 24 and to be used within a specific pre-determined distance between strut 64 side rails of a strut system 62. The bottom surface component 16*f* is smaller in size than the top surface portion 16*a* leaving edges 16*g*1 and 16*g*2 that support the main body component 16 on a top surface of the strut side rails 64*a*, 64*b* of the strut system 62. However, the present invention is not limited the size, shape and receptacles illustrated in FIG. 3 and other sizes, shapes and receptacles can be used for the main body component to practice the invention.

In another embodiment, the main the body component 16 is manufactured with a manufactured connection to a separate strut securing component 24 that is permanently attached to the bottom surface component 16*f*. In another embodiment, the main body component 16 is manufactured as a single component with the size and shape described herein including strut securing component 24 as an integral component included as part of the bottom surface component 16*f*. In this embodiment, the bottom surface 16*f* of the main body component 16 is a curved surface component (e.g., 24*b*, etc.) However, the present invention is to these embodiments and other sizes, shapes and receptacles can be used for the main body component to practice the invention.

Figure 4:
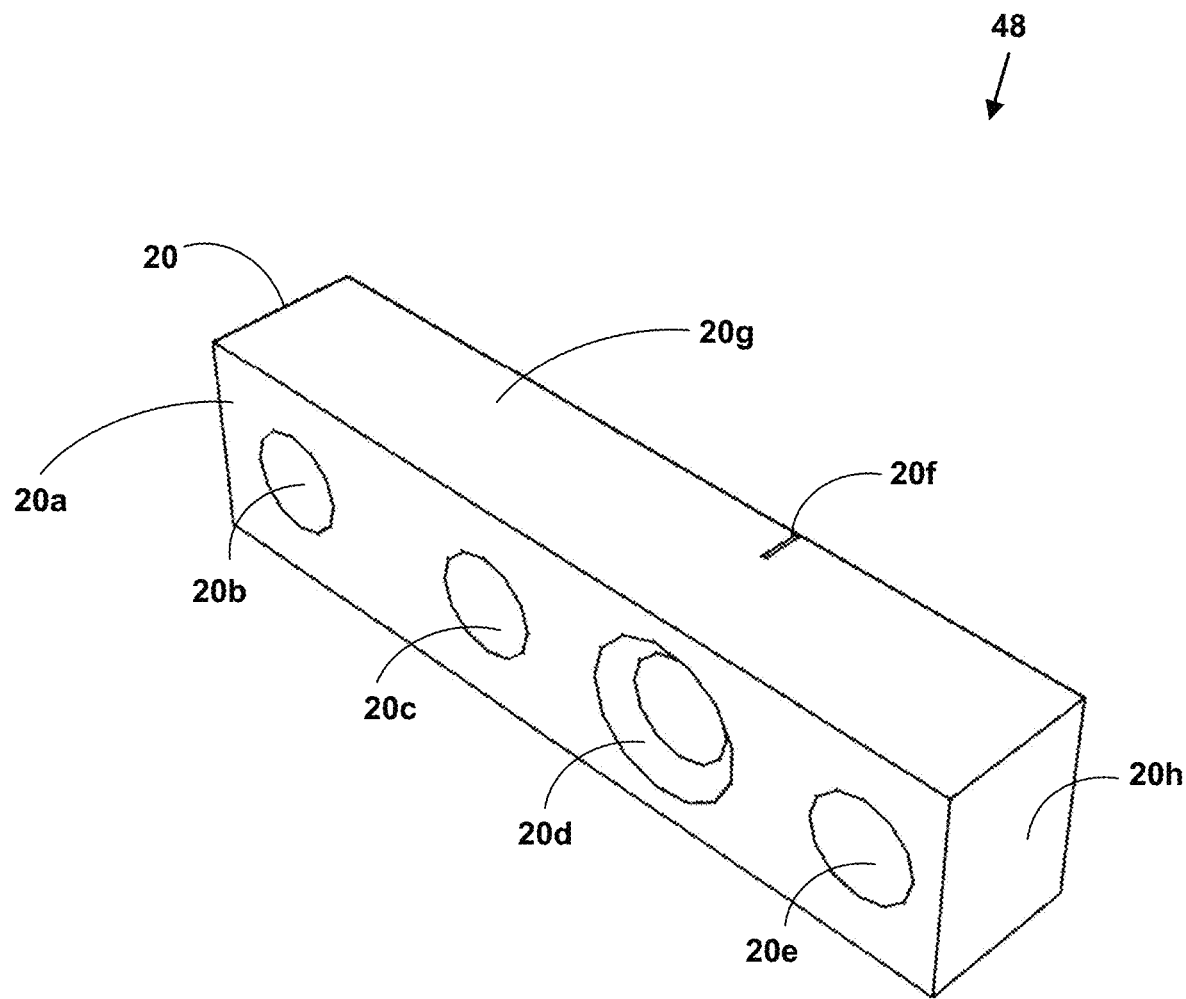
FIG. 4. is a block diagram illustrating a perspective view of an exemplary flip arm stop component.

FIG. 4 is a block diagram 48 illustrating an exemplary flip arm stop component 20.

The flip arm stop component 20 includes a rectangular component including a front face 20*a* including a first receptacle 20*b* for accepting and passing through the flip arm stop attachment pivot connecting means 18, a second receptacle 20*c* for accepting and passing through the first alignment connecting means 26 inserted into the first alignment connecting dowel 28. In one embodiment, the first alignment connecting means 26 and the flip arm stop attachment pivot connecting means 18 each include a threaded bolt. However, the present invention is not limited to this embodiment and other connection means can be used to practice the invention. The first alignment connection dowel 28 is hollow, protects the threads of the first alignment connecting means 26 and helps prevent injury to a user or snagging a body component, clothes and/or tools of a user on its threads. The first alignment connecting dowel 28 also provides a smooth glide mounting component 73 (FIG. 12) through the flip arm stop component 20 to align, hold and keep the work stop positioning plate 40 stable and in place.

The first alignment connecting means 26 included within the first hollow alignment connecting dowel 28 and the second alignment connecting means 36 included within the second alignment connecting dowel 38 also provide protection on each side of the calibrated dial 34, preventing the calibrated dial 34 from being bent or damaged and preventing the calibrated dial 34 from being accidently moved.

The flip arm stop component 20 further includes a third receptacle 20*d* that is a countersunk and/or counterbored receptacle with beveled edges passing through the flip arm stop component 20. A front face of the third receptacle 20*d* is beveled for accepting the snap C-clip ring 30.

A "countersink" includes a conical hole cut into a material. A common use of a countersink is to allow the head of a countersunk bolt, screw, rivet, snap ring, etc. when placed in a receptacle, to sit flush with or below the surface of the surrounding material in the receptacle.

A "counterbore" is a cylindrical flat-bottomed hole that enlarges another coaxial hole. A counterbore hole is typically used when a fastener, such as a head of a countersunk bolt, screw, rivet, snap ring, etc., is required to sit flush with or below the level of a component's surface.

A "bevel" includes an edge of a structure that is not perpendicular to the faces of the structure. In the present invention, the bevel includes a slanted beveled shape or a rounded bullet shape. The edges on the bevel are typically ground at about a twenty-two degree angle within the countersink. However, the present invention is not limited to this embodiment and other types of bevels with other angles can be used to practice the invention.

In another embodiment, 20*d* does not include a countersunk and/or counterbored receptacle and does not include any beveled edges. However, the present invention is not limited to this embodiment, and other embodiments can be used to practice the invention.

The snap C-clip ring 30 accepts a first end of a threaded micro-adjusted rod 32 through the third receptacle 20*d* passing through the flip arm stop component 20. A second end of the threaded micro-adjusted rod controls the calibrated dial 34.

The snap C-clip ring 30 includes a retaining ring that is a fastener that holds components or assemblies onto a shaft or in a housing/bore when installed. Once installed, the exposed portion of the snap C-clip ring acts as a shoulder support which retains the specific component or assembly including the calibrated dial 34. In the present invention, the snap C-clip ring 30 retains the first end of the threaded micro-adjusted rod 32 that is connected to the calibrated dial 34 with the second end of the micro-adjusted rod 32, so the C-clip ring supports the calibrated dial 34 in a stable horizontal position within the main body component 16.

However, the present invention is not limited to use of the snap C-clip ring 30 and other embodiments can be used to practice the invention. For example, the threaded micro-adjusted rod 32 can be passed through the third receptacle 20d of the flip arm stop component 20 and can be connected directly to work stop positioning plate 40 without shoulder support, etc.

Figure 5:
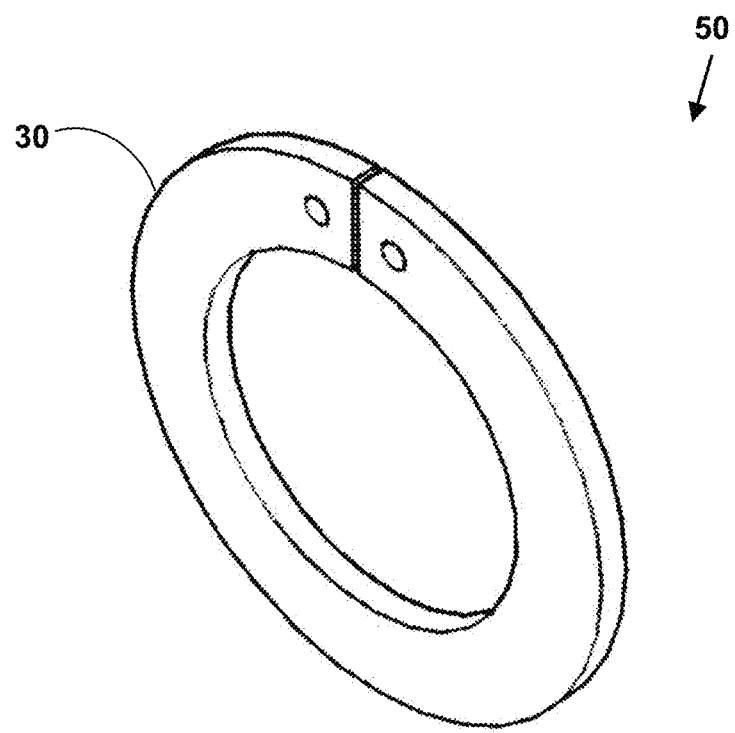
FIG. 5 is a block diagram illustrating an exemplary snap C-clip ring component.

FIG. 5 is a block diagram 50 illustrating an exemplary snap C-clip ring component 30.

Returning to FIG. 4, the flip arm stop component 20 further includes a fourth receptacle 20e for accepting and passing through the second alignment connecting means 36 inserted into the second alignment connecting dowel 38. In one embodiment, the second alignment connecting means 36 includes a threaded bolt. However, the present invention is not limited to this embodiment and other connection means can be used to practice the invention. The second alignment connection dowel 38 is hollow, protects the threads of the second alignment connecting means 36 and helps prevent injury to a user or snagging a body component, clothes and/or tools of a user on its threads.

The first alignment connecting means 26 inserted into the first alignment connecting dowel 28 and the second alignment connecting means 36 inserted into a second alignment connecting dowel 38 also protect the calibrated dial 34 from being bent, damaged and/or moved from its current micro-adjusting position.

In another embodiment, first alignment connecting means 26 and the second alignment connecting means 36 are used without the first and second alignment connecting dowels 28, 38. However, the present invention is not limited to such an embodiment and other embodiments can be used to practice the invention.

In another embodiment, the flip arm stop component 20 does not include the fourth receptacle 20e or the second alignment connecting means 36 inserted into the second alignment connecting dowel 38. Only the first alignment connecting means 26 inserted into the first alignment connecting dowel 28 is used to connect the flip arm stop component 20 to the work stop positioning plate 40. However, the present invention is not limited to such an embodiment and other embodiments can be used to practice the invention.

In one embodiment, connecting means 18, 26, 36, also include shoulder bolts, shoulder pins, and/or threaded rods with nyloc nuts, lock nuts, double nuts and/or jam nuts, etc. A "jam nut" is a low profile type of nut, typically half as tall as a standard nut. It is commonly used as a type of locknut, where it is "jammed" up against a standard nut to lock the two in place. A "nyloc nut," also referred to as a nylon-insert lock nut, polymer-insert lock nut, or elastic stop nut, is a kind of locknut with a nylon collar that increases friction on the screw thread. However, the present invention is not limited to such an embodiment and other bolts, pins, rods and nuts can be used as attachment means to practice the invention.

The flip arm stop component 20 further includes a calibration marker 20f on a top surface 20g and a bottom surface (not visible in FIG. 4) of the flip arm stop component 20. The calibration marker 20f is used as a marker to align with one of plural calibration marks 34a on the calibrated dial 34. In one embodiment, the calibration marker 20f is included on the flip arm stop component 20 with an additive process as additional material (e.g., metal, plastic, composite materials, ink, etc.) added to the top surface 20a and bottom surface of the flip arm stop component 20 calibration to create the calibration marker 20f. In another embodiment, the calibration marker 20f is included on the top surface of the flip arm component 20 with a subtractive process, by removing material from the top surface of the flip arm component 20 to form a groove, channel, etching, etc. In another embodiment, the flip arm stop component 20 further includes a calibration marker 20f on a side surface 20g. However, the present invention is not limited to these embodiments and other embodiments may be used to practice the invention.

Figure 6:
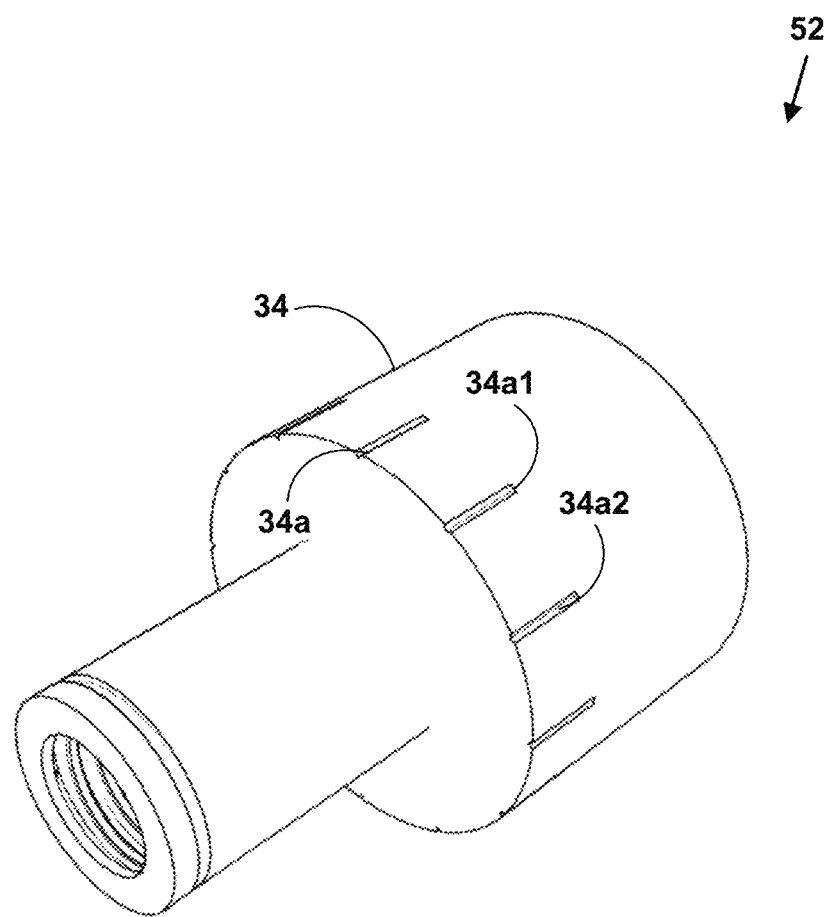
FIG. 6 is a block diagram illustrating an exemplary calibrated dial component.

FIG. 6 is a block diagram 52 illustrating an exemplary calibrated dial component 34.

The calibrated dial 34 provides a calibrated position of the work stop positioning plate 40 to accurately and precisely measure and cut a piece of material 67, 90 (e.g., wood, metal, plastic, etc.) The calibrated dial 34 is embossed with plural calibration marks 34a of pre-determined increments that are used to align with the calibration marker 20f on the flip arm stop component 20 for precise measuring.

In one embodiment, the plural calibration marks are embossed with distance graduations of 0.0052 thousands of an inch (0.13208 millimeters) increments for use with a $\frac{3}{8}$—16 threaded micro-adjusted rod 32 that is $\frac{3}{8}$ inches in diameter and includes 16 threads per inch. However, the present invention is not limited to such threaded micro-adjusted rods 32 and other threaded micro-adjusted rod 32 other sizes and thread counts can be used to practice the invention. This distance graduation provides very precise micro-adjustments for a material 67, 90 that is being cut.

A thousandth of an inch is a derived unit of length in a system of units using inches. Equal to $\frac{1}{1000}$ of an inch, it is normally referred to as a "thou," a "thousandth," or a "mil." In machining metal, the "thou" is often treated as a basic unit, 0.0001 inches (2.54 micrometers) is referred to as "one tenth", meaning "one tenth of a thou" or "one ten thousandth."

About twelve rotations of the calibrated marks 34a of the 0.0052 thousands of an inch measurement (12× 0.0052=0.0624) on the calibrated dial 34 past the calibration marker 20f on the flip arm stop component 20 is equivalent to about $\frac{1}{16}$ (0.0625) of an inch, a common measurement on a tape measure, ruler and/or other measuring device used for both wood, metal, plastic, materials. However, the present invention is not limited to such an embodiment and calibrated dials with other measurements can be used to practice the invention.

In another embodiment, the plural calibration marks are embossed with distance graduations of $\frac{1}{16}$ (0.0625) of an inch, a common measurement on a tape measure, ruler and/or other measuring device used for both wood, metal, plastic, etc. materials. However, the present invention is not limited to these measurements and other measurements can be used to micro-adjustments to practice the invention.

When the calibrated dial 34 is rotated, it micro-adjusts the work stop positioning plate 40 to a new desired measuring position. If the calibrated dial 34 is rotated from a first calibration mark 34a1 to a second calibration mark 34a2, the work positioning plate 40 is adjusted 0.0052 thousands of an inch. One of the plural calibration marks 34a are in alignment with the calibration marker 20f included on the top surface or bottom surface of the flip arm component 20. However, the present invention is not limited to such an embodiment and calibrated dials with other measurements can be used to practice the invention.

In another embodiment, the calibrated dial 34 is replaced a bolt with a hexagon head, octagon head, or other X-sided head, wherein X is a number of bolt head sides. In such an embodiment, one of the edges of the hexagon, octagon, etc. bolt head surface aligns with the calibration marker 20f on the flip arm stop component 20 for precise measuring. However, the present invention is not limited to an embodiment and other embodiments can be used to practice the invention.

Figure 7:
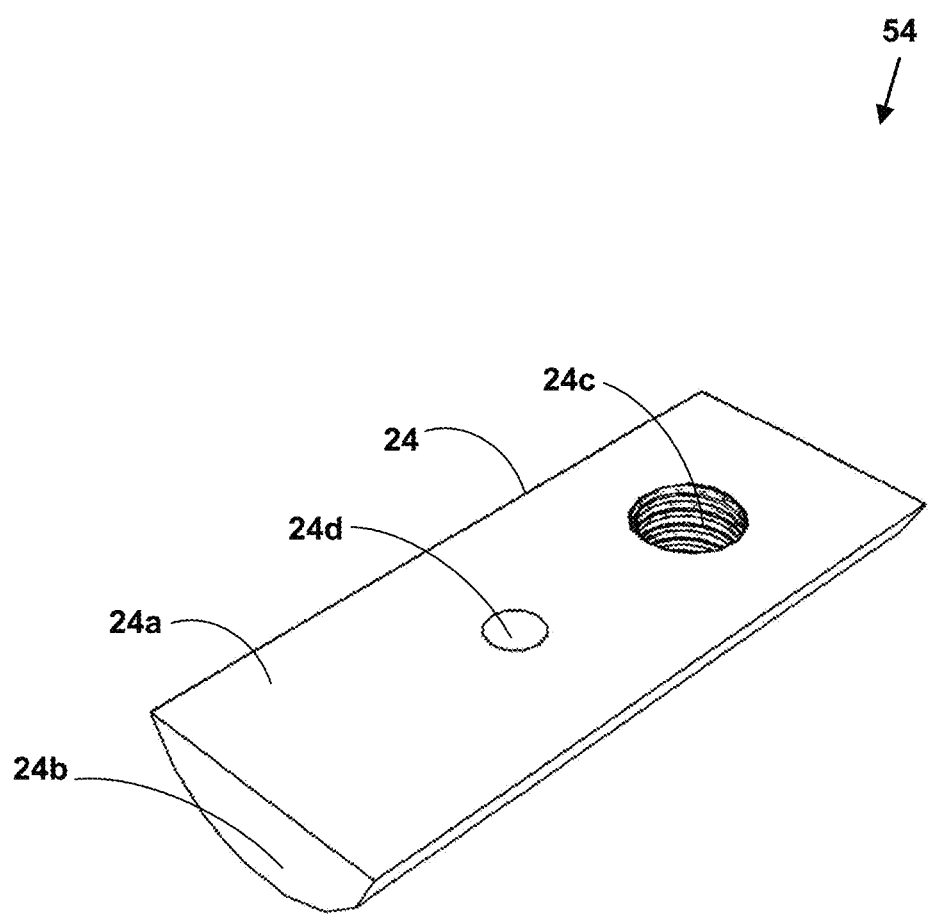
FIG. 7 is a block diagram illustrating an exemplary strut securing component.

FIG. 7 is a block diagram 54 illustrating an exemplary strut securing component 24.

The strut securing component 24 includes a flat top surface component 24a and a curved bottom surface component 24b. The surface component 24a is specifically sized and shaped to engage a curved interior surface of the strut rail 64 in the strut system 62 to help securely position the reversible flip-away work-stop 12 within the interior of the strut rail 64 in the strut system 62.

The strut securing component 24 further includes a first threaded receptacle 24c for accepting the strut securing component of the handle connection means 14c. The strut securing component 24 further includes a second through receptacle 24d allowing first strut securing connecting means 22 to pass through and align the component 24 in the strut rail 64 of the strut system 62.

The strut securing component 24 is illustrated with curved bottom surface 24b. However, the present invention is not limited to this embodiment and other shapes (e.g., square, rectangle, triangle, T-shaped, Y-shaped, other polygon, etc.) can be used to practice the invention and allow the invention to be used in different types of strut systems 62 with different types of strut rail 64 configurations.

In one embodiment, the strut securing component 24 is manufactured to a pre-determined precise length so the front edge strut securing component 24 is exactly and precisely aligned 69 (FIG. 10B) with the front edge of the work stop positioning plate 40 to allowing easy reading of a measurement scale in the strut rail 64 in the strut system 62. In another embodiment, the strut securing component 24 is manufactured to a pre-determined precise length with a front edge of the main body component 16 so the front edge strut securing component 24 is behind a front edge of the work stop positioning plate 40. In such an embodiment, the flip arm stop attachment pivot connecting means 18 can be rotated a full three-hundred sixty degrees around the main body component 16. However, the present invention is not limited to these embodiments and strut securing components 24 of other lengths can be used to practice the invention.

In one embodiment, the strut securing component 24 is manufactured to a pre-determined precise length such as six inches, twelve inches, etc. to allow the reversible flip-away work-stop 12 apparatus to be used as a measuring apparatus in the strut rail 64 of a strut system 62 without an integral strut measuring component 66. This allows one or more of the reversible flip-away work-stops 12 to be used as a "story stick" components. A "story stick" component includes a project's critical measurements marked in full-scale proportion (e.g., a twenty foot piece of material 67, 90 marked every 8 1/16 inches, etc.). Taken together, story stick components present a precise visual representation of measurements for the project. However, the present invention is not limited to these embodiments and strut securing components 24 of other lengths can be used to practice the invention.

The strut securing component 24 is also manufactured with a pre-determined width and shape similar to a strut measuring component 66 (FIG. 10B) in a strut system 62. For example, in FIG. 10B, the shape of the strut securing component 24 includes a curved bottom portion 24b which is a similar shape to the curved strut measuring component 66 and a similar width of the strut measuring component in the strut system 62.

The precise length, width and shape of the strut securing component 24 provides an ability to precisely read the strut measuring component 66 at a measurement it is currently indicating which also precisely corresponds to the front edge of the work stop positioning plate 40.

Figure 14:
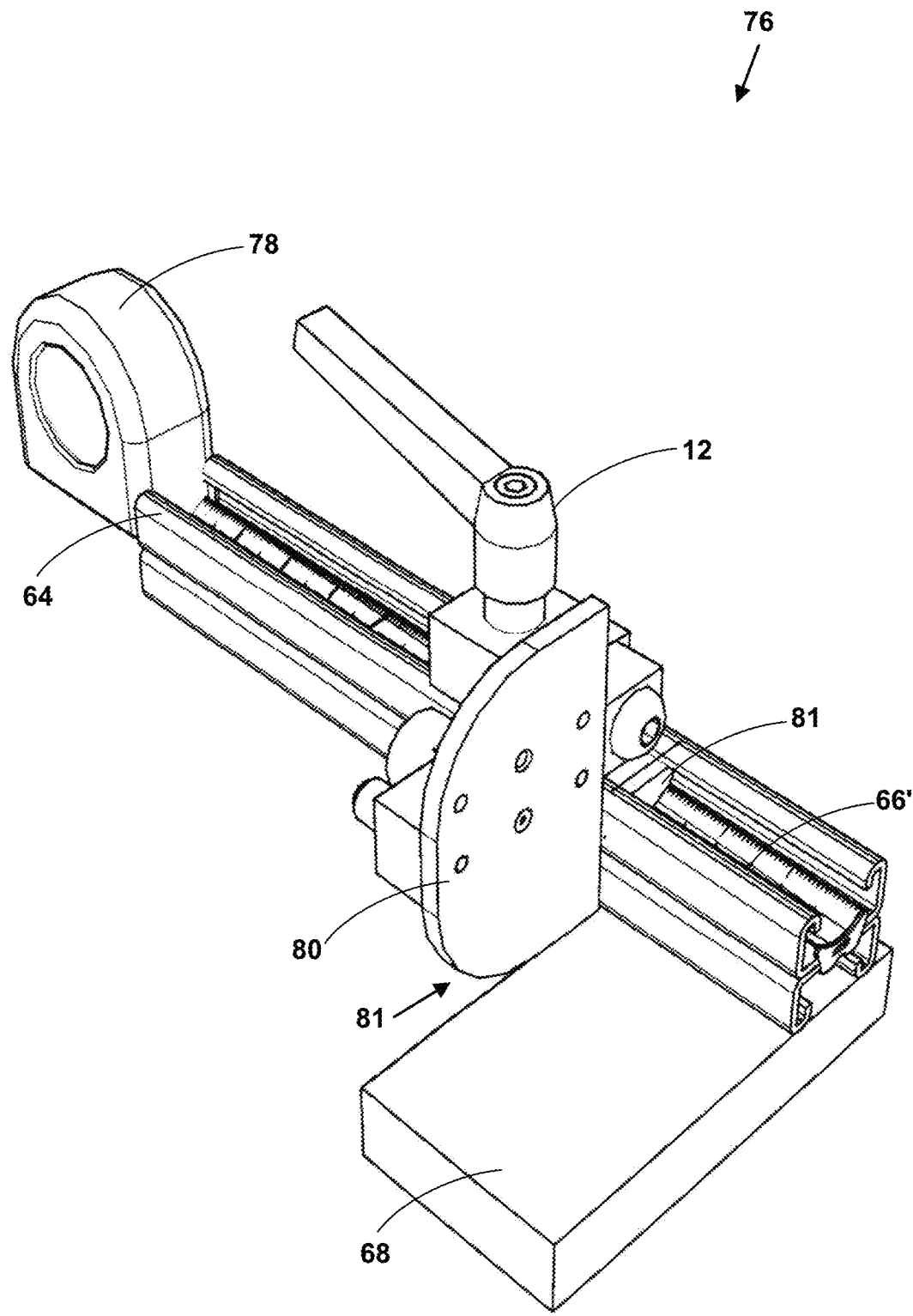
FIG. 14 is a block diagram illustrating an exemplary left side front perspective view of the exemplary reversible flip-away work stop for strut systems with a retractable tape measure and a curved work stop positioning plate.

For example, in FIG. 14, item 81 illustrates the front end of the strut securing component 24 is precisely aligned with the front edge of the work stop positioning plate 40 and allows a visible measurement 81 to be made on the strut measuring component 66' of exactly three inches.

The pre-determined length, width and shape of the strut securing component 24 allows the reversible flip-away work stop 12 to be used with an existing integral strut measuring component 66 of the strut system 62.

The pre-determined length, width and shape of the strut securing component 24 allow the reversible flip-away work stop 12 to be used with an add-on strut measuring component 66' (e.g., retractable tape measure 78, FIG. 14) in a strut system 62 without an integral strut measuring component 66.

Flip stops known in the art are not manufactured to a precise length and width, are not aligned with a work stop plate 40 and typically obscure a user's ability to precisely read a measurement on a strut measuring component 66. Flip stops known in the art are also typically not manufactured to a similar shape of a strut measuring component 66 and cannot be used directly in or on the integral strut measuring component 66 in a strut system 62.

Figure 8:
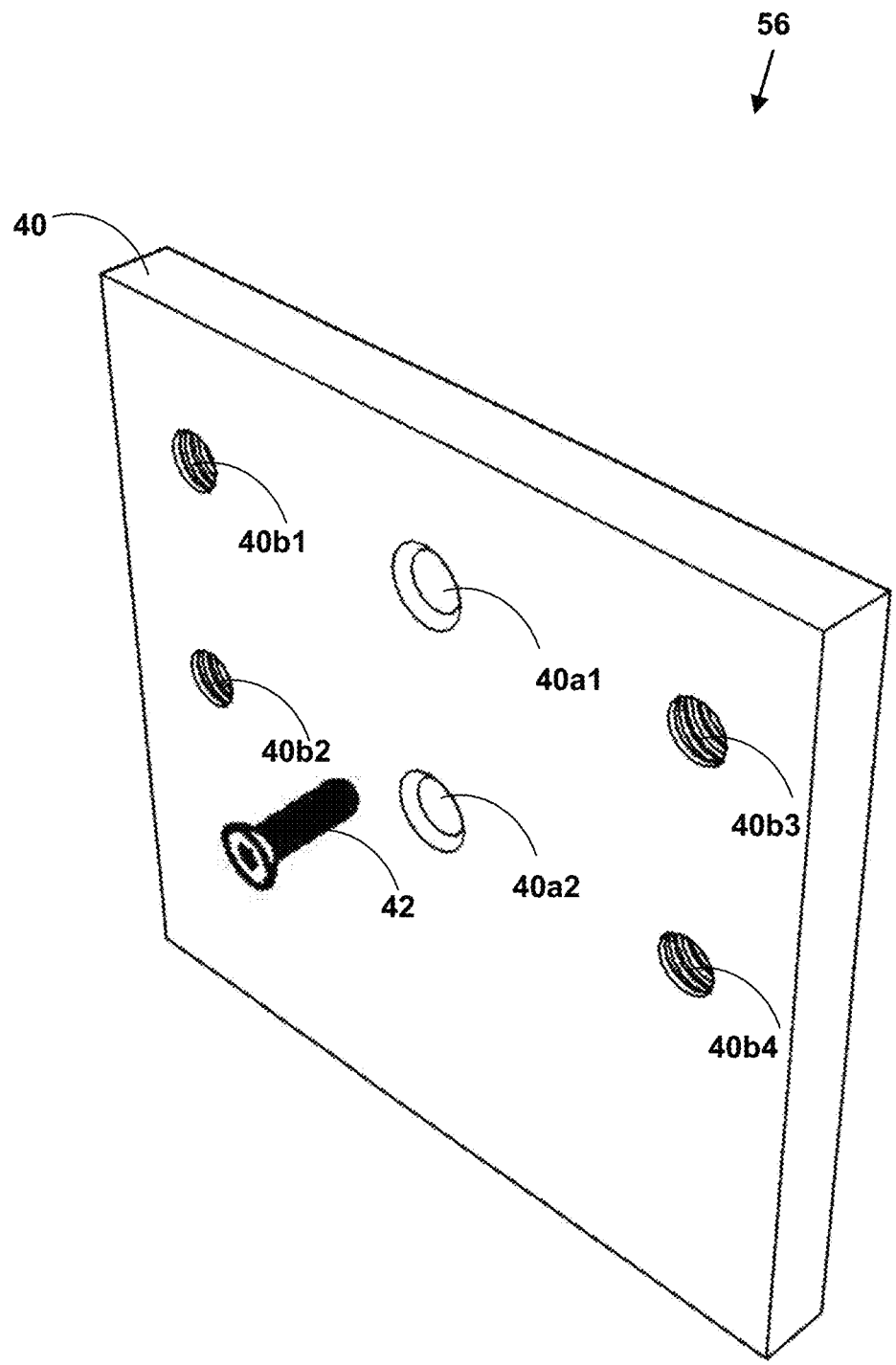
FIG. 8 is a block diagram illustrating an exemplary work stop positioning plate.

FIG. 8 is a block diagram 56 illustrating an exemplary work stop positioning plate 40.

The work stop positioning plate 40 is attached to the flip arm stop component 20 with one or more work stop positioning plate fastening connecting means 42. The work stop positioning plate 40 accepts and applies pressure an end of the material 67, 90 being cut on the strut system 62.

In one embodiment, the work stop positioning plate 40 has one or more countersunk and/or counterbored beveled receptacles for attaching the work stop positioning plate 40 to the flip arm stop component 20 with the one or more work stop positioning plate fastening connecting means 42 as a flat head screw. However, the present invention is not limited to such an embodiment and the invention can be practiced either with and/or without countersunk and/or counterbored beveled receptacles.

In one embodiment, the one or more work stop positioning plate fastening screws 42 include a flat head screw that fits within one of the countersunk beveled receptacles 40a1, 40a2 and includes a flat screw head with a hexagonal socket. Hexagonal screws are commonly used where precise measurement tolerances are needed. Hexagonal screws are used with a hex key, Allen wrench or Allen key, a tool used to insert and remove screws with hexagonal sockets in their heads.

In one embodiment, the work stop positioning plate fastening connection means 42 also includes shoulder bolts, shoulder pins, and/or threaded rods with nyloc nuts, lock nuts, double nuts or jam nuts. However, the present invention is not limited to such an embodiment and other bolts, pins, rods and nuts can be used as attachment means to practice the invention.

In another embodiment, reversible flip-away work stop 12 includes a the work stop positioning plate fastening connection means 42 that only connects the work stop positioning plate 40 to the flip arm stop component 20 and does not connect to the threaded micro-adjusting rod 32. However, the present invention is not limited to such an embodiment, and other embodiments can be used to practice the invention.

The work stop positioning plate 40 further includes plural threaded through receptacles 40b1, 40b2, 40b3, 40b4 for positioning the work stop positioning plate 40 with multiple positioning points.

The work stop positioning plate 40 is illustrated a square shape in FIG. 8 and FIGS. 10-13, 16-17. However the present invention is not limited to such an embodiment and other shapes (e.g., rectangle, triangle, circular, oval, polygon, etc.) can be used to practice the invention. FIG. 14 includes an exemplary curved work stop positioning plate 40. In one embodiment of the present invention, the work stop positioning plate 40 is provided as a set of multiple different shapes and sizes interchangeable to use with materials of different shapes and sizes.

Figure 9:
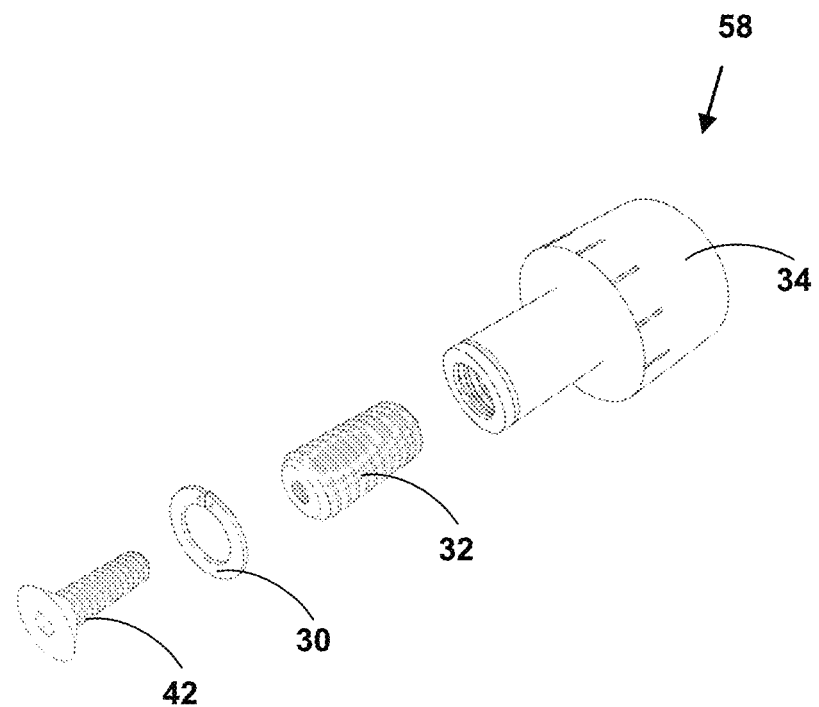
FIG. 9 is a block diagram illustrating an exemplary connection between a work stop fastening screw, snap C-clip ring, threaded micro-adjusted rod and a calibrated dial.

FIG. 9 is a block diagram illustrating an exemplary connection between the work stop positioning plate fastening connecting means 42, snap C-clip ring 30, threaded micro-adjusting rod 32 and the calibrated dial 34 in additional detail.

The work stop positioning plate fastening connecting means 42 passes through the snap C-clip ring into the second end of the threaded micro-adjusting rod 32 and the first end of the micro-adjusting rod 32 is connected to the calibrated dial 34.

FIG. 10A is a block 60 diagram illustrating an exemplary strut system 62.

Figure 10B:
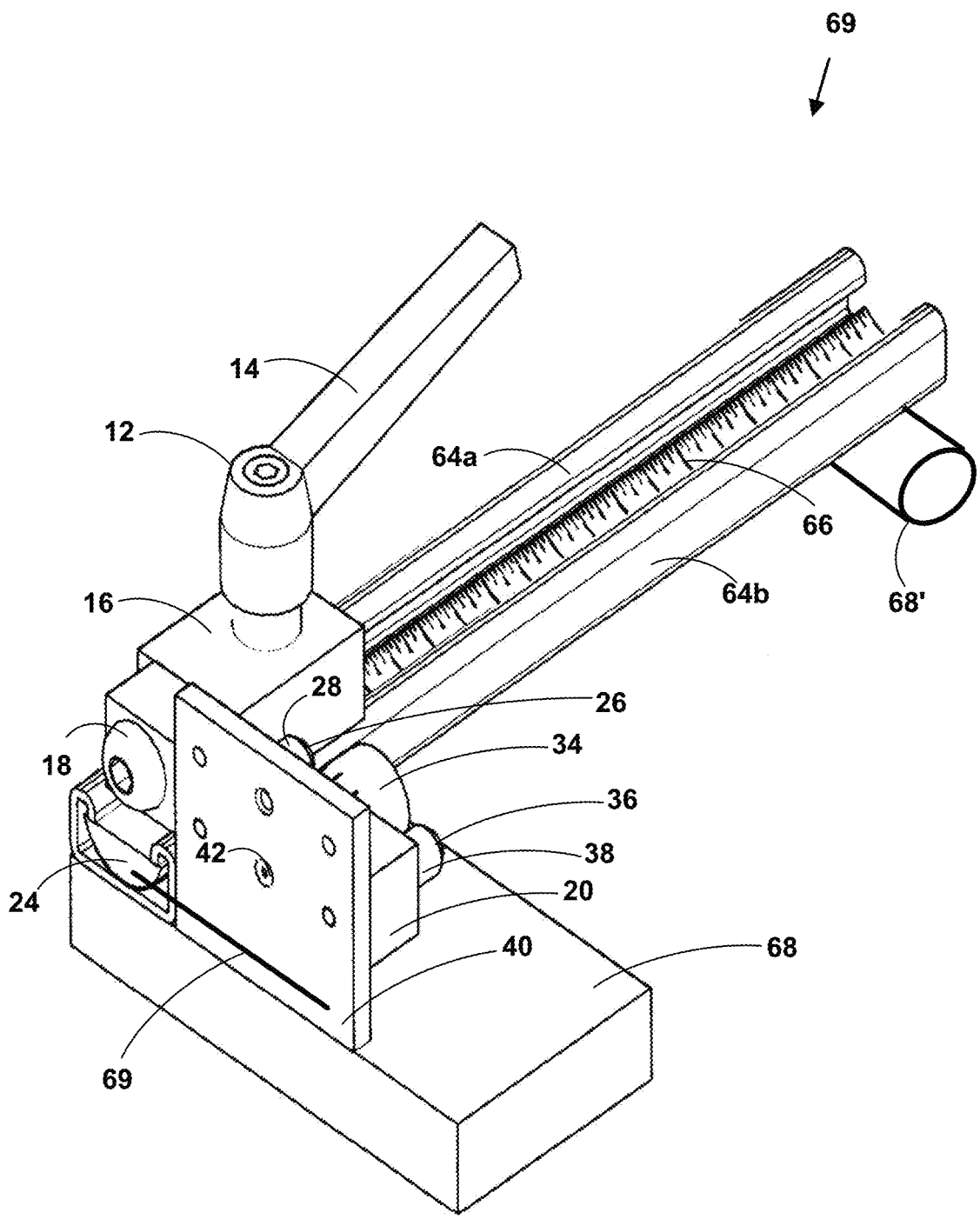
FIG. 10B is a block diagram illustrating an exemplary right side front perspective view of the exemplary reversible flip-away work stop for strut systems.

FIG. 10A illustrates a strut rail 64 in which the reversible flip-away work stop 12 is inserted. Strut rail 64 includes an integral strut measuring component 66 (the details of which are illustrated in FIG. 10B), a cutting saw 63 placed on the strut system 62, a strut support structure 65 to support the strut system 62, a material 67 (e.g. wood, metal, plastic, etc.) to be cut and plural strut rail support components 68, 68'. FIG. 10A illustrates both flat and round strut rail support components 68, 68'.

FIG. 10B is a block diagram 69 illustrating an exemplary right front perspective view of the exemplary reversible flip-away work stop 12 for strut system 62.

FIG. 10B illustrates a strut system 62 with two side rail components 64a, 64b, a curved strut measuring component 66 and a flat strut rail support component 68. The work stop positioning plate 40 is positioned on the right hand side of the reversible flip-away work stop 12 as viewed from the front. In FIG. 10B, the strut rail support component 68 is illustrated as a flat component which would extend out about a twelve inches or more to support long pieces of material 67 to be cut. A typical strut rail system includes plural strut rail supports that are placed on legs or tripods 65 to allow a user to cut materials 67 with the cutting saw 63 at an appropriate height off the ground. However, the present invention is not limited to such an embodiment, and strut systems typically have round 68', oval and/or other shaped strut rail components. In other embodiments the strut rail support component 68 includes rollers to allow the material 67 being cut to be easily moved.

Figure 11:
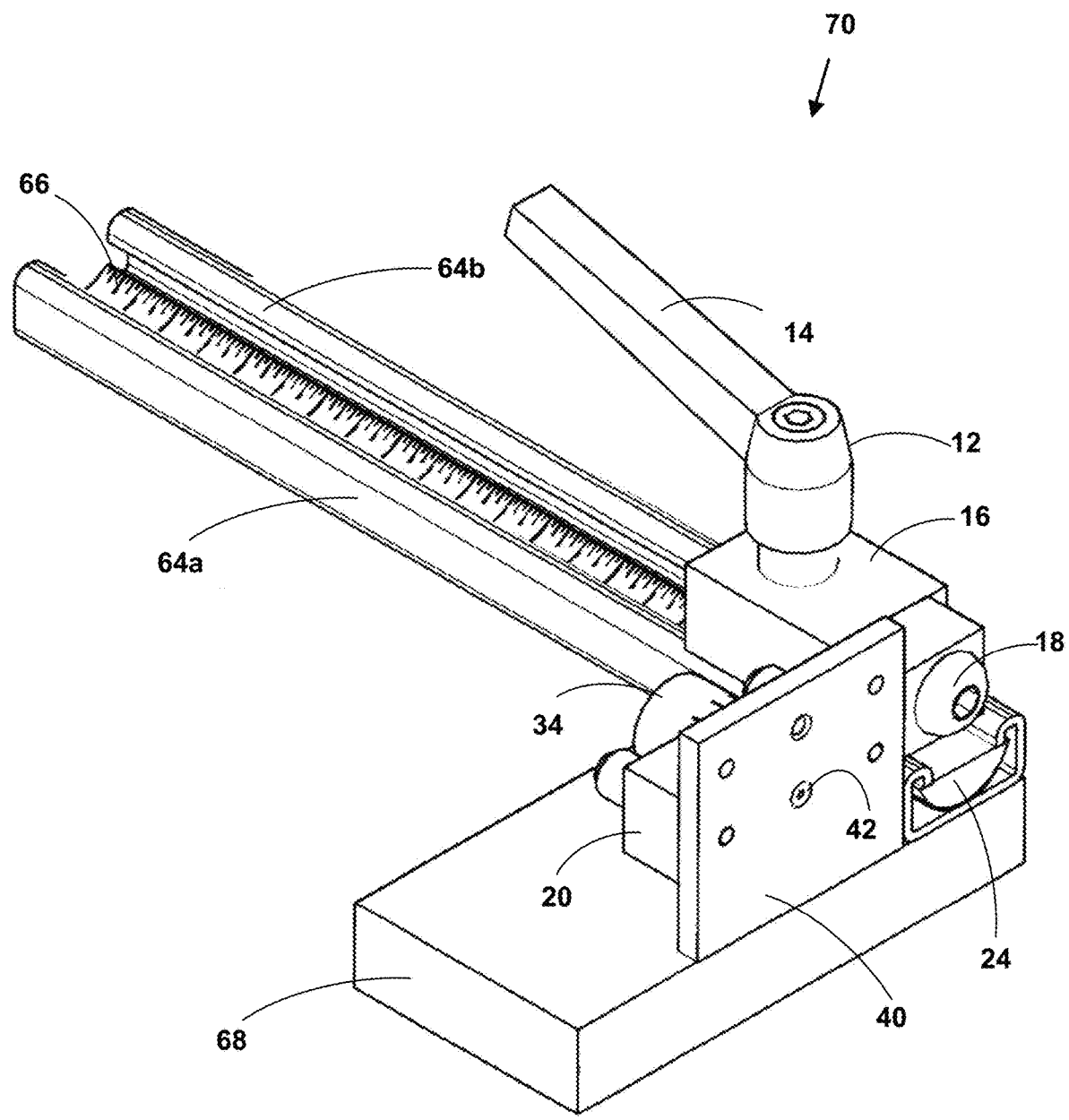
FIG. 11 is a block diagram illustrating an exemplary left side front perspective view of the exemplary reversible flip-away work stop for strut systems.

FIG. 11 is a block diagram 70 illustrating an exemplary left front perspective view of the exemplary reversible flip-away work stop 12 for strut system 62.

FIG. 11 illustrates the strut system 62 with the two side rail components 64a, 64b, the strut measuring component 66 and the strut rail end connection component 68. The work stop positioning plate 40 is positioned on the left hand side of the reversible flip-away work stop 12 as viewed from the front.

Figure 12:
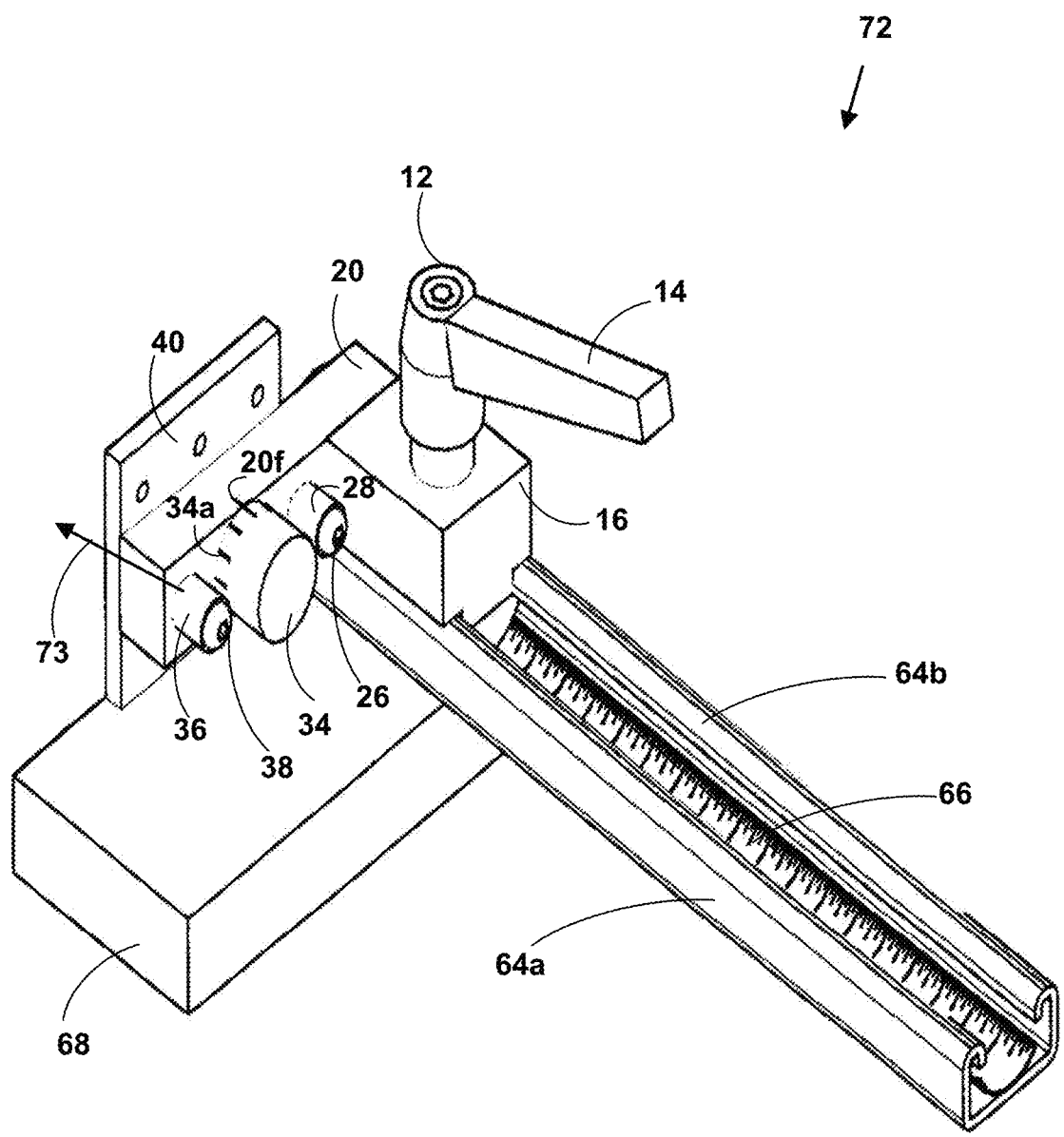
FIG. 12 is a block diagram illustrating an exemplary back left side perspective view of the exemplary reversible flip-away work stop for strut systems.

FIG. 12 is a block diagram 72 illustrating an exemplary back left side perspective view of the exemplary reversible flip-away work stop 12 for strut system 62.

FIG. 12 illustrates the strut system 62 with two side rail components 64a, 64b, the strut measuring component 66 and the strut rail end connection component 68. The work stop positioning plate 40 is positioned on the left hand side of the reversible flip-away work stop 12 as viewed from the back but is on the right hand side if viewed from the front.

Figure 13:
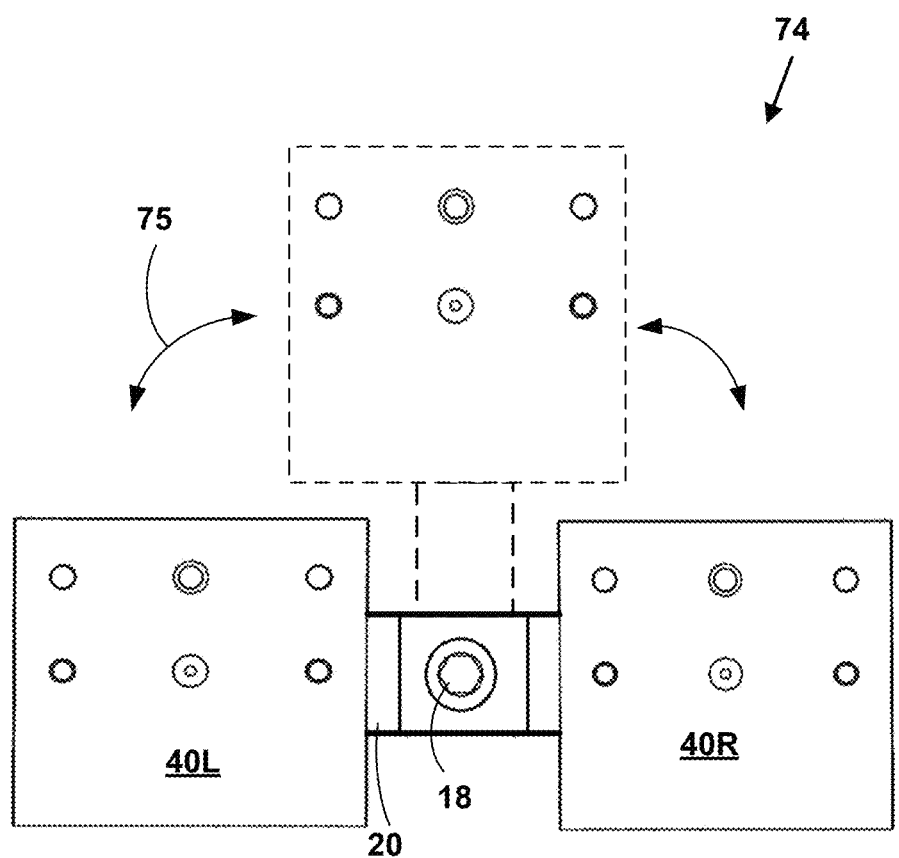
FIG. 13 is a block diagram illustrating an exemplary motion of a work stop positioning plate as viewed from the front.

FIG. 13 is a block diagram 74 illustrating an exemplary motion 75 of the work stop positioning plate 40 as viewed from the front.

The work stop positioning plate 40 pivots at least one hundred eight degrees in a semi-circular motion around the flip arm stop attachment pivot connecting means 18 immediately from a right hand configuration to a left hand configuration and vice-versa with the need for dis-assembly and re-assembly.

As was discussed above, if the strut securing component 24 is manufactured to a pre-determined precise length with a front edge of the main body component 16 so the front edge strut securing component 24 is behind a front edge of the work stop positioning plate 40 then the flip arm stop attachment pivot connecting means 18 can be rotated a full three-hundred sixty degrees around the main body component 16.

Flip stops known in the art cannot be immediately rotated and/or pivoted immediately from a right hand configuration to a left hand configuration without disassembly and reassembly, which takes a considerable amount of time and manual effort by a user.

FIG. 14 is a block diagram 76 illustrating an exemplary left side front perspective view of the exemplary reversible flip-away work stop 12 for strut systems 62 with a retractable tape measure 78 and a curved work stop positioning plate 80.

FIG. 14 also illustrates a retractable tape measure 78 used as the strut measuring component 66' in the strut system 62. In this embodiment, any available tape measure of any length (e.g., 10 feet, 15 feet, 20 feet, 25 feet, 50 feet, 75 feet, 100 feet, etc.) can be used with any strut system 62 that includes and/or does not include its own existing integral strut measuring system 66. If a strut system 62 includes an existing integral strut measuring system 66 already, the retractable tape measure 78 is placed over the top of the existing integral measuring system 66. For example, the existing integral strut measuring system 66 may include a different measuring system (e.g., metric instead of US standard, etc.) or may be at a scale not precise enough to cut the desired material 67, 90 (e.g., includes measurements only to an inch instead of fractions of an inch, etc.).

Many strut systems known in the art do not include an integral measuring component 66 for measuring a material 67, 90 to be cut. Strut systems known in the art do not provide the ability to insert a retractable tape measure or other ruler making them less flexible and less useful as a retractable tape measure is a commonly available tool in most construction and manufacturing environments.

In FIG. 14, the curved work stop positioning plate 80 provides a work stop for wood or metal materials including curved surfaces (e.g., wood molding materials, tubular and/or curved metal materials, etc.). The curved work stop positioning plate 80 also allows the plate 80 to be placed on top of a long piece of material 67, 90 being cut on the strut system 66. The curved work stop positioning plate provides downward tension on the material 67, 90 being cut instead of end pressure on the material 67, 90 being cut. In such an embodiment, the long material is advanced by pulling or pushing and is cut multiple times on the strut system 66 with the cutting saw 63. When the end of the long material 67, 90 being cut passes beyond the curved work stop positioning plate 80, the plate 80 rotates down to again engage the top surface of the strut rail 64 end connection component 68 and the end of the material 67, 90 can be pushed back against the plate 80 for final cuts to be completed at a desired length.

The curved work stop positioning plate 80 also allows a user with a long piece of material 67, 90 (e.g., ten to twenty feet long, etc.) to be cut to slide the material 67, 90 down the strut system 62 and when the material 67, 90 engages the curved plate 80 is it pushed up and out of the way on top of the material 67, 90 to be cut as a result of its curved shape. The curved shape creates a space 81 between an edge of the curved surface of the curved plate 80 and the strut rail support 68 which allows edge of a material 67, 90 being cut slide underneath and lift the curved plate 80 upward. The curved plate 80 ends up on a top surface of the material 67, 90 being cut applying downward pressure on the material 67, 90 being cut.

The curved plate 80 also a allows a user who may be working by him/herself to slide the long piece of material 67, 90 onto the strut system 62 via an edge of the long material 67, 90 without having walk to and engage the flip stop 12 and move the curved work stop positioning plate 80 up and out of the way to get the material 67, 90 on the strut system 62.

Flip stops known in the art do not have curved work stop plates and do not allow work stop plates to be pushed up and out of the way on top of the material 67, 90 to be cut.

Figure 15:
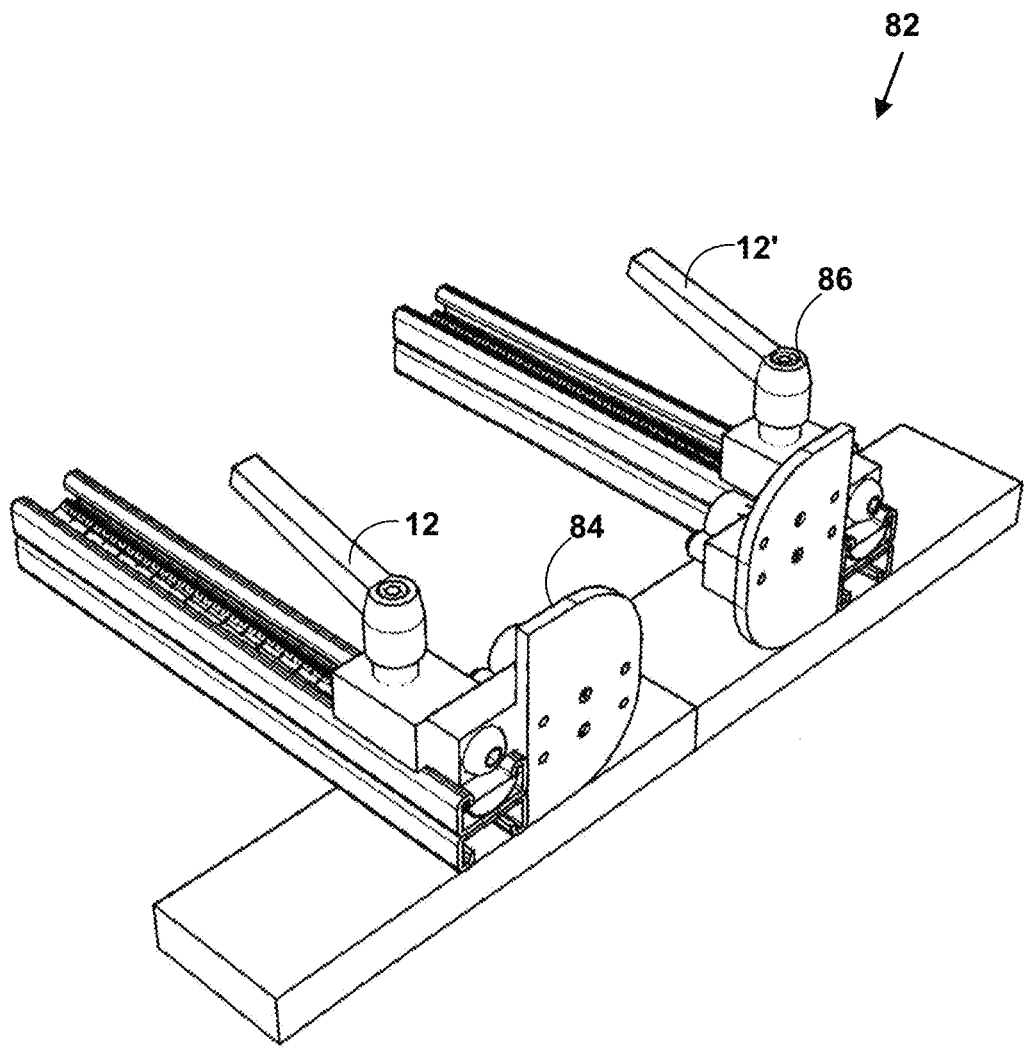
FIG. 15 is a block diagram illustrating an exemplary right side and left side front perspective view of the exemplary reversible flip-away work stop for strut systems with a curved work stop positioning plate.

FIG. 15 is a block diagram 82 illustrating an exemplary right side 84 and left side 86 front perspective view of the exemplary reversible flip-away work stop 12 for strut systems 62 with a curved work stop positioning plate 80 as viewed from the front.

Figure 16:
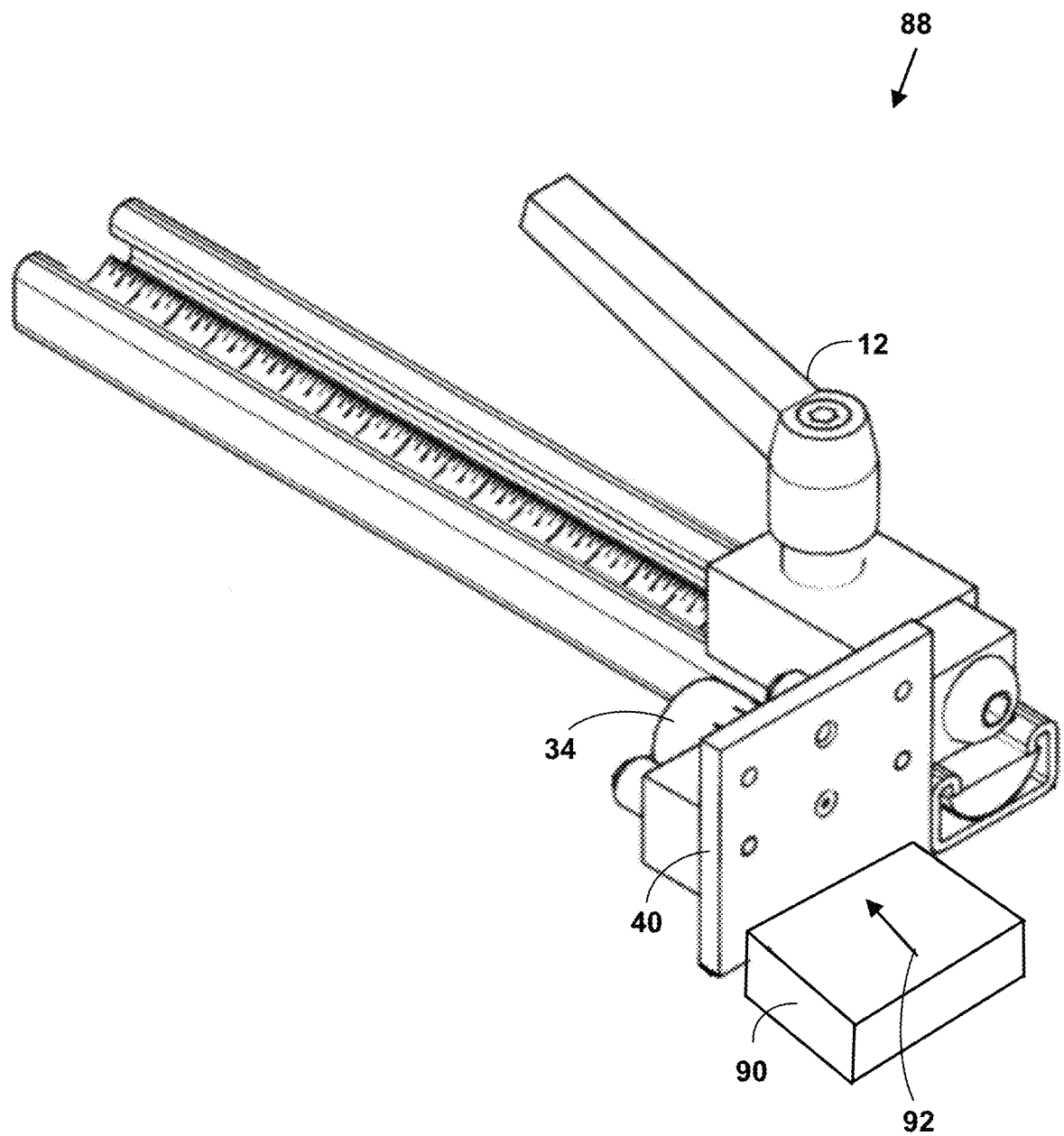
FIG. 16 is a block diagram illustrating an exemplary reversible flip-away work stop with a piece of material against the work stop plate.

FIG. 16 is a block diagram 88 illustrating an exemplary reversible flip-away work stop 12 with a portion of a material 90 to be cut pushed against the work stop positioning plate 40.

In FIG. 16, the portion of the material 90 is pushed against the work stop positioning plate 40 with a force 92 to position the material 90 against the work stop positioning plate 40 for precise measurement adjustment with calibrated dial 34 and for cutting.

Figure 17:
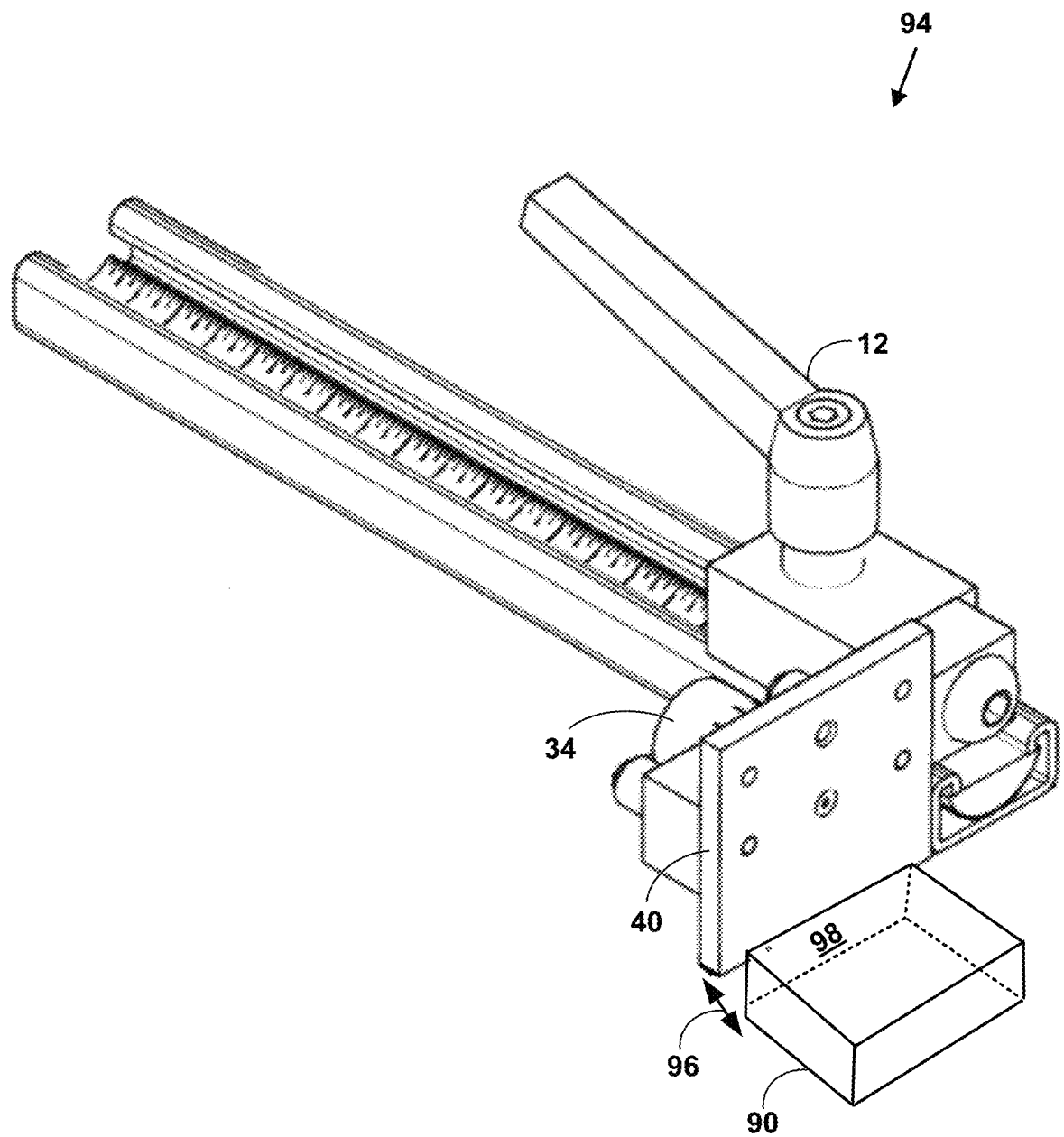
FIG. 17 is a block diagram illustrating an exemplary reversible flip-away work stop with the work stop plate moved back and away from the material a pre-determined distance.

FIG. 17 is a block diagram 94 illustrating an exemplary reversible flip-away work stop 12 with the work stop plate 40 moved back and away from the material 90 a pre-determined distance 96.

In FIG. 17, displacing the piece of material 90 to be cut a pre-determined distance from the work stop plate 40 allows a side face 96 component of the material 90 to machined and/or cut (e.g., with a wood router, etc.) to a desired shape and/or size by the saw 63 and/or another cutting or shaping machine (not illustrated in FIG. 17).

In one embodiment, plural reversible flip-away work stops 12 are used to keep the material being cut 67, 90, locked into place on the strut system 62.

The various embodiments of the reversible flip-away work stop 12 are illustrated as a multiple component work stop 12. In another embodiment, the work stop 12 is manufacture with the main body component 16, and the strut securing component 24 including one continuous component and the flip arm stop component 20 and the work stop positioning plate 40 are one continuous component. However, the present invention is not limited to these embodiments and other combinations of continuous components and separate components can be used to practice the invention.

The work stops known in the art are typically placed alongside the strut rail 64 in the strut system 62. This placement typically interferes with the material 67, 90 being cut and requires frequent repositioning in the strut system 62. The reversible flip-away work stop 12 is placed within the strut rail 64 of the strut system 62 and does not interfere with the material 67, 90 being cut.

The various embodiments of the reversible flip-away work stop 12 are illustrated as square and/or rectangular shapes. However, the present invention is not limited to such embodiments reversible flip-away work stop 12 also includes components with other shapes (e.g., round, oval, etc.).

The reversible flip-away work stop 12 has been described herein as being used in a strut rail 64 in a strut system 62. However, the present invention is not limited to such an embodiment and the reversible flip-away work stop 12 can also be used with other rail and/or strut systems, including, but not limited to, T-tracks and/or other rail, channel and/or strut systems.

"T-tracks" include a slotted rail component shaped like the letter-T that are available in two, four, six and eight foot lengths.

In such an embodiment for a T-track system, main body component 16 and the strut securing component 24 of the reversible flip-away work stop 12 would be specifically sized and shaped to fit with the T-track slotted rail component and/or the other rail, channel and/or strut system.

It should be understood that the architecture, materials, components, methods and systems described herein are not related or limited to any particular type of unless indicated otherwise architecture, materials, components, methods and systems. Various types of general purpose or specialized architecture, materials, components, methods and systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or elements may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A reversible flip-away work stop for strut systems, comprising in combination:
   a ratcheting repositioning handle for grasping the reversible flip-away work stop and for locking and unlocking the reversible flip-away work stop into a desired physical position on a strut rail in a strut system, the ratcheting repositioning handle connected to a main body component;

the main body component accepting the ratcheting repositioning handle in a first receptacle on a top surface, a strut securing component in a second receptacle on a bottom surface and a flip arm stop component in a third receptacle on a front surface;

the strut securing component including an exact pre-determined length to exactly match an alignment of a front face of a work stop positioning plate allowing a measurement to be read on a strut measuring component in the strut rail on the strut system and including a strut securing component shape matching a shape of the strut measuring component in the strut rail on the strut system allowing easy movement of the reversible flip-away work stop within the strut rail in the strut system;

the flip arm stop component comprising a first receptacle for accepting a flip arm stop attachment pivot connecting means, a second receptacle for passing through a first alignment connecting means, a third countersunk beveled receptacle for accepting a snap C-clip ring and passing through a first end of a micro-adjusting rod, a fourth receptacle for passing through a second alignment connecting means, the flip arm stop component further including a calibration marker on a top surface and bottom surface for with aligning with a calibration mark from a calibrated dial when the work stop positioning plate is configured in either a right-handed or left-handed configuration in the strut rail in the strut system;

the flip arm stop attachment pivot connecting means allowing the work stop positioning plate to pivot in a semi-circular motion at least 180 degrees in each direction around the flip arm stop attachment connecting means allowing the work stop positioning plate to be dynamically changed into the right-handed or left-handed configuration in the strut rail in the strut system;

the first alignment connecting means included within a first hollow alignment connecting dowel connected to a first receptacle on a work stop positioning plate;

the second alignment connecting means included within a second hollow alignment connecting dowel connected to a second receptacle on the work stop positioning plate;

the first hollow alignment connecting dowel and second hollow alignment connecting dowel proving a glide mounting component through the flip arm stop component to align, hold and keep the work stop positioning plate stable and in place;

the first alignment connecting means included within the first hollow alignment connecting dowel and the second alignment connecting means included within the second hollow alignment connecting dowel providing protection on each side of the calibrated dial, preventing the calibrated dial from being bent or damaged and preventing the calibrated dial from being accidently moved from a current micro-adjusted measuring position;

the snap C-clip ring accepting and supporting a first end of a threaded micro-adjusting rod supporting the calibrated dial in a stable horizontal position via a second end of the threaded micro-adjusting rod connected to the calibrated dial;

the threaded micro-adjusting rod connected at the first end to a work stop positioning plate fastening connecting means and at the second end to the calibrated dial;

the calibrated dial including a plurality of calibrated position marks, the calibrated dial when rotated between calibrated position marks moves the threaded micro-adjusting rod a pre-determined micro-distance which in turns moves the work stop positioning plate the same pre-determined micro-distance;

the work stop positioning plate for accepting and applying pressure to an end of a material to be cut on the strut system, for moving the pre-determined micro distance initiated by rotation of the calibrated dial to allow cutting the material at an exact measured distance in the strut rail on the strut system and for providing the right-handed and the left-handed configuration of the work stop positioning plate in the strut rail;

the work stop positioning plate fastening connection means connected through a countersunk beveled receptacle on the work stop positioning plate into the second end of the threaded micro-adjusting rod to connect the work stop positioning plate to the flip arm stop component and to support the second end of the micro-adjusting rod connected to the calibrated dial.

2. The reversible flip-away work stop of claim 1 wherein the calibrated dial when rotated between calibrated position marks on the calibrated dial moves the threaded micro-adjusting rod a distance of 0.0052 thousands of an inch, which in turns moves the work stop positioning plate the same distance.

3. The reversible flip-away work stop of claim 1 wherein the calibrated dial when rotated between calibrated position marks on the calibrated dial moves the threaded micro-adjusting rod a distance of 1/16 (0.0625) of an inch, which in turns moves the work stop positioning plate the same distance.

4. The reversible flip-away work stop of claim 1 wherein the strut securing component includes a flat top surface and a curved bottom surface or a flat bottom surface.

5. The reversible flip-away work stop of claim 1 wherein a pre-determined length, width and shape of the strut securing component allows the reversible flip-away work stop to be used with an existing integral strut measuring component of the strut system.

6. The reversible flip-away work stop of claim 1 wherein the work stop positioning plate includes a square, rectangular, round, oval or other polygonal shape.

7. The reversible flip-away work stop of claim 1 further including a set of interchangeable work stop positioning plates comprising a plurality of different shapes and sizes.

8. The reversible flip-away work stop of claim 1 wherein the calibrated dial allows the work stop positioning plate to be moved back away from a side surface of the material being cut allowing the side surface of the material being cut to be shaped or machined.

9. The reversible flip-away work stop of claim 1 wherein the first alignment connecting dowel and second alignment connecting dowel protects threads of the first alignment connecting means and the threads of second alignment connecting means and helps prevent injury to a user of the reversible flip-away work stop from snagging a body component, clothes, or tools of the user on the threads.

10. The reversible flip-away work stop of claim 1 wherein the work stop positioning plate fastening connection means includes a flat head screw with a hexagonal socket in the screw head.

11. The reversible flip-away work stop of claim 1 wherein the flip arm stop attachment pivot connecting means includes a threaded bolt with a hexagonal socket in the bolt head.

12. The reversible flip-away work stop of claim 1 wherein the first alignment connecting means and the second alignment connecting means include threaded bolts.

13. The reversible flip-away work stop of claim 1 wherein the first alignment connecting means, the second alignment connecting means, the flip arm stop attachment pivot connecting means and the work stop positioning plate fastening connection means include shoulder bolts, shoulder pins or threaded rods with nyloc nuts, lock nuts, double nuts or jam nuts.

14. The reversible flip-away work stop of claim 1 wherein the individual components of the reversible flip-away work stop are manufactured, machined, 3D printed by a 3D printer, extruded or pultruded.

15. The reversible flip-away work stop of claim 1 wherein the individual components of the reversible flip-away work stop include individual components made from metal, plastic, wood or composite materials or a combination thereof.

16. The reversible flip-away work stop of claim 1 wherein a pre-determined length, width and shape of the strut securing component allow the reversible flip-away work stop to be used with an add-on strut measuring component in another strut system without an integral strut measuring component.

17. The reversible flip-away work stop of claim 16 wherein the add-on strut measuring component is a retractable tape measure.

18. The reversible flip-away work stop of claim 1 wherein the work stop positioning plate includes a polygon shape with curved surfaces.

19. The reversible flip-away work stop of claim 18 wherein the work stop positioning plate including the polygon shape with the curved surfaces providing a space between the curved surface and a strut system support component allowing the material being cut to push the work stop positioning plate up and onto a top surface of the material being cut applying downward pressure on the material being cut.

\* \* \* \* \*